United States Patent
Wu

(10) Patent No.: US 11,322,171 B1
(45) Date of Patent: May 3, 2022

(54) PARALLEL SIGNAL PROCESSING SYSTEM AND METHOD

(71) Applicant: Wai Wu, Massapequa, NY (US)

(72) Inventor: Wai Wu, Massapequa, NY (US)

( * ) Notice: Subject to any disclaimer, the term of this patent is extended or adjusted under 35 U.S.C. 154(b) by 0 days.

(21) Appl. No.: 17/068,219

(22) Filed: Oct. 12, 2020

Related U.S. Application Data

(60) Division of application No. 16/186,252, filed on Nov. 9, 2018, now Pat. No. 10,803,883, and a continuation of application No. 15/633,211, filed on Jun. 26, 2017, now Pat. No. 10,127,925, said application No. 16/186,252 is a continuation-in-part of application No. 15/633,211, filed on Jun. 26, 2017, now Pat. No. 10,127,925, which is a continuation of application No. 14/744,377, filed on Jun. 19, 2015, now Pat. No. 9,692,908, which is a division of application No. 13/968,522, filed on Aug. 16, 2013, now Pat. No. 9,064,496, which is a division of application No. 12/337,236, filed on Dec. 17, 2008, now Pat. No. 8,515,052.

(60) Provisional application No. 61/014,106, filed on Dec. 17, 2007.

(51) Int. Cl.
| | |
|---|---|
| *G10L 21/00* | (2013.01) |
| *G10L 25/27* | (2013.01) |
| *G10L 15/34* | (2013.01) |
| *G10L 25/21* | (2013.01) |
| *H04M 19/02* | (2006.01) |
| *G10L 25/18* | (2013.01) |
| *H04M 7/12* | (2006.01) |

(52) U.S. Cl.
CPC .............. *G10L 25/27* (2013.01); *G10L 15/34* (2013.01); *G10L 25/18* (2013.01); *G10L 25/21* (2013.01); *H04M 7/129* (2013.01); *H04M 19/02* (2013.01)

(58) Field of Classification Search
CPC ......... G10L 25/27; G10L 15/34; G10L 25/18; G10L 25/21; H04M 7/129
See application file for complete search history.

(56) References Cited

U.S. PATENT DOCUMENTS

| | | |
|---|---|---|
| 5,164,990 A | 11/1992 | Pazienti et al. |
| 5,611,038 A | 3/1997 | Shaw et al. |
| 5,729,659 A | 3/1998 | Potter |
| 5,754,456 A | 5/1998 | Eitan et al. |
| 5,774,357 A | 6/1998 | Hoffberg et al. |
| 5,875,108 A | 2/1999 | Hoffberg et al. |
| 5,901,246 A | 5/1999 | Hoffberg et al. |
| 5,968,167 A | 10/1999 | Whittaker et al. |

(Continued)

*Primary Examiner* — Simon King
(74) *Attorney, Agent, or Firm* — Hoffberg & Associates; Steven M. Hoffberg

(57) ABSTRACT

A system and method for processing a plurality of channels, for example audio channels, in parallel is provided. For example, a plurality of telephony channels are processed in order to detect and respond to call progress tones. The channels may be processed according to a common transform algorithm. Advantageously, a massively parallel architecture is employed, in which operations on many channels are synchronized, to achieve a high efficiency parallel processing environment. The parallel processor may be situated on a data bus, separate from a main general-purpose processor, or integrated with the processor in a common board or integrated device. All, or a portion of a speech processing algorithm may also be performed in a massively parallel manner.

20 Claims, 3 Drawing Sheets

(56) References Cited

U.S. PATENT DOCUMENTS

| | | |
|---|---|---|
| 5,983,161 A | 11/1999 | Lemelson et al. |
| 6,055,619 A | 4/2000 | North et al. |
| 6,061,711 A * | 5/2000 | Song .................. G06F 9/461 |
| | | 718/108 |
| 6,081,750 A | 6/2000 | Hoffberg et al. |
| 6,094,637 A | 7/2000 | Hong |
| 6,121,998 A | 9/2000 | Voois et al. |
| 6,124,882 A | 9/2000 | Voois et al. |
| 6,226,389 B1 | 5/2001 | Lemelson et al. |
| 6,275,239 B1 | 8/2001 | Ezer et al. |
| 6,275,773 B1 | 8/2001 | Lemelson et al. |
| 6,353,843 B1 | 3/2002 | Chehrazi et al. |
| 6,400,996 B1 | 6/2002 | Hoffberg et al. |
| 6,418,424 B1 | 7/2002 | Hoffberg et al. |
| 6,487,500 B2 | 11/2002 | Lemelson et al. |
| 6,493,467 B1 * | 12/2002 | Okuda .................. G06T 1/20 |
| | | 382/260 |
| 6,507,614 B1 | 1/2003 | Li |
| 6,553,130 B1 | 4/2003 | Lemelson et al. |
| 6,630,964 B2 | 10/2003 | Burns et al. |
| 6,636,986 B2 | 10/2003 | Norman |
| 6,640,145 B2 | 10/2003 | Hoffberg et al. |
| 6,654,783 B1 | 11/2003 | Hubbard |
| 6,738,358 B2 | 5/2004 | Bist et al. |
| 6,748,020 B1 | 6/2004 | Eifrig et al. |
| 6,754,279 B2 | 6/2004 | Zhou et al. |
| 6,847,365 B1 | 1/2005 | Miller et al. |
| 6,850,252 B1 | 2/2005 | Hoffberg |
| 6,889,312 B1 | 5/2005 | McGrath et al. |
| 6,906,639 B2 | 6/2005 | Lemelson et al. |
| 6,907,518 B1 | 6/2005 | Lohman et al. |
| 6,931,370 B1 | 8/2005 | McDowell |
| 6,948,050 B1 * | 9/2005 | Gove .................. G06F 9/3851 |
| | | 712/35 |
| 6,959,372 B1 | 10/2005 | Hobson et al. |
| 6,981,132 B2 | 12/2005 | Christie et al. |
| 6,981,134 B2 | 12/2005 | Yamamura |
| 7,003,093 B2 | 2/2006 | Prabhu et al. |
| 7,003,450 B2 | 2/2006 | Sadri et al. |
| 7,043,006 B1 | 5/2006 | Chambers et al. |
| 7,136,710 B1 | 11/2006 | Hoffberg et al. |
| 7,158,141 B2 | 1/2007 | Chung et al. |
| 7,210,139 B2 | 4/2007 | Hobson et al. |
| 7,218,645 B2 | 5/2007 | Lotter et al. |
| 7,219,085 B2 | 5/2007 | Buck et al. |
| 7,234,141 B2 | 6/2007 | Coles et al. |
| 7,242,988 B1 | 7/2007 | Hoffberg et al. |
| 7,286,380 B2 | 10/2007 | Hsu et al. |
| 7,317,840 B2 | 1/2008 | DeCegama |
| 7,333,036 B2 | 2/2008 | Oh et al. |
| 7,418,008 B2 | 8/2008 | Lotter et al. |
| 7,430,578 B2 | 9/2008 | Debes et al. |
| 7,451,005 B2 | 11/2008 | Hoffberg et al. |
| 7,461,426 B2 | 12/2008 | Gould et al. |
| 7,496,917 B2 | 2/2009 | Brokenshire et al. |
| 7,506,135 B1 | 3/2009 | Mimar |
| 7,539,714 B2 | 5/2009 | Macy, Jr. et al. |
| 7,548,586 B1 | 6/2009 | Mimar |
| 7,565,287 B2 | 7/2009 | Sadri et al. |
| 7,602,740 B2 | 10/2009 | Master et al. |
| 7,609,297 B2 | 10/2009 | Master et al. |
| 7,630,569 B2 | 12/2009 | DeCegama |
| 7,650,319 B2 | 1/2010 | Hoffberg et al. |
| 7,657,881 B2 | 2/2010 | Nagendra et al. |
| 7,665,041 B2 | 2/2010 | Wilson et al. |
| 7,689,935 B2 | 3/2010 | Gould et al. |
| 7,742,531 B2 | 6/2010 | Xue et al. |
| 7,777,749 B2 | 8/2010 | Chung et al. |
| 7,805,477 B2 | 9/2010 | Oh et al. |
| 7,813,822 B1 | 10/2010 | Hoffberg |
| 7,840,778 B2 | 11/2010 | Hobson et al. |
| 7,890,549 B2 | 2/2011 | Elad et al. |
| 7,890,648 B2 | 2/2011 | Gould et al. |
| 7,904,187 B2 | 3/2011 | Hoffberg et al. |
| 7,908,244 B2 | 3/2011 | Royo et al. |
| 7,953,021 B2 | 5/2011 | Lotter et al. |
| 7,953,768 B2 | 5/2011 | Gould et al. |
| 7,966,078 B2 | 6/2011 | Hoffberg et al. |
| 7,974,297 B2 | 7/2011 | Jing et al. |
| 7,974,714 B2 | 7/2011 | Hoffberg |
| 7,979,574 B2 | 7/2011 | Gillo et al. |
| 7,987,003 B2 | 7/2011 | Hoffberg et al. |
| 8,005,147 B2 | 8/2011 | Alvarez et al. |
| 8,024,549 B2 | 9/2011 | Stewart |
| 8,031,060 B2 | 10/2011 | Hoffberg et al. |
| 8,032,477 B1 | 10/2011 | Hoffberg et al. |
| 8,046,313 B2 | 10/2011 | Hoffberg et al. |
| 8,064,952 B2 | 11/2011 | Rofougaran et al. |
| 8,068,683 B2 | 11/2011 | DeCegama |
| 8,069,334 B2 | 11/2011 | Mimar |
| 8,073,704 B2 | 12/2011 | Suzuki |
| 8,085,834 B2 | 12/2011 | Hanke et al. |
| 8,095,782 B1 * | 1/2012 | Danskin .................. G06F 9/461 |
| | | 712/228 |
| 8,117,370 B2 | 2/2012 | Rofougaran et al. |
| 8,122,143 B2 | 2/2012 | Gould et al. |
| 8,139,608 B2 | 3/2012 | Lotter et al. |
| 8,190,854 B2 | 5/2012 | Codrescu et al. |
| 8,194,593 B2 | 6/2012 | Jing et al. |
| 8,200,730 B2 | 6/2012 | Oh et al. |
| 8,214,626 B2 | 7/2012 | Macy, Jr. et al. |
| 8,223,786 B2 | 7/2012 | Jing et al. |
| 8,229,134 B2 | 7/2012 | Duraiswami et al. |
| 8,253,750 B1 | 8/2012 | Huang et al. |
| 8,280,232 B2 | 10/2012 | McCrossan et al. |
| 8,306,387 B2 | 11/2012 | Yamashita et al. |
| 8,340,960 B2 | 12/2012 | Sadri et al. |
| 8,346,838 B2 | 1/2013 | Debes et al. |
| 8,364,136 B2 | 1/2013 | Hoffberg et al. |
| 8,369,967 B2 | 2/2013 | Hoffberg et al. |
| 8,374,242 B1 | 2/2013 | Lewis et al. |
| 8,407,263 B2 | 3/2013 | Elad et al. |
| 8,412,981 B2 | 4/2013 | Munoz et al. |
| 8,425,322 B2 | 4/2013 | Gillo et al. |
| 8,429,625 B2 | 4/2013 | Liege |
| 8,437,407 B2 | 5/2013 | Rosenzweig et al. |
| 8,442,829 B2 | 5/2013 | Chen |
| 8,479,175 B1 | 7/2013 | Heuler |
| 8,484,154 B2 | 7/2013 | You et al. |
| 8,488,683 B2 | 7/2013 | Xue et al. |
| 8,502,825 B2 | 8/2013 | Zalewski et al. |
| 8,504,374 B2 | 8/2013 | Potter |
| 8,510,707 B1 | 8/2013 | Heuler |
| 8,515,052 B2 | 8/2013 | Wu |
| 8,526,623 B2 | 9/2013 | Franck et al. |
| 8,539,039 B2 | 9/2013 | Sheu et al. |
| 8,542,732 B1 | 9/2013 | Lewis et al. |
| 8,549,521 B2 | 10/2013 | Brokenshire et al. |
| 8,555,239 B1 | 10/2013 | Heuler |
| 8,559,400 B2 | 10/2013 | Lotter et al. |
| 8,565,519 B2 | 10/2013 | Weybrew |
| 8,566,259 B2 | 10/2013 | Chong et al. |
| 8,583,263 B2 | 11/2013 | Hoffberg et al. |
| 8,605,910 B2 | 12/2013 | Franck et al. |
| 8,620,772 B2 | 12/2013 | Owen |
| 8,676,574 B2 | 3/2014 | Kalinli |
| 8,688,959 B2 | 4/2014 | Macy, Jr. et al. |
| 8,693,534 B1 | 4/2014 | Lewis et al. |
| 8,700,552 B2 | 4/2014 | Yu et al. |
| 8,713,285 B2 | 4/2014 | Rakib et al. |
| 8,719,437 B1 | 5/2014 | Bazzarella, Jr. et al. |
| 8,731,945 B2 | 5/2014 | Potter |
| 8,745,541 B2 | 6/2014 | Wilson et al. |
| 8,755,515 B1 | 6/2014 | Wu |
| 8,756,061 B2 | 6/2014 | Kalinli et al. |
| 8,759,661 B2 | 6/2014 | Van Buskirk et al. |
| 8,762,852 B2 | 6/2014 | Davis et al. |
| 8,768,097 B2 | 7/2014 | Wang et al. |
| 8,768,142 B1 | 7/2014 | Ju et al. |
| 8,788,951 B2 | 7/2014 | Zalewski et al. |
| 8,789,144 B2 | 7/2014 | Mazzaferri et al. |
| 8,811,470 B2 | 8/2014 | Kimura et al. |
| 8,819,172 B2 | 8/2014 | Davis et al. |
| 8,825,482 B2 | 9/2014 | Hernandez-Abrego et al. |

(56) References Cited

U.S. PATENT DOCUMENTS

| | | |
|---|---|---|
| 8,831,279 B2 | 9/2014 | Rodriguez et al. |
| 8,831,760 B2 | 9/2014 | Gupta et al. |
| 8,849,088 B2 | 9/2014 | Sasaki et al. |
| 8,861,898 B2 | 10/2014 | Candelore et al. |
| 8,862,909 B2 | 10/2014 | Branover et al. |
| 8,867,731 B2 | 10/2014 | Lum et al. |
| 8,908,631 B2 | 12/2014 | Jing et al. |
| 8,935,468 B2 | 1/2015 | Maydan et al. |
| 8,949,633 B2 | 2/2015 | Belmont et al. |
| 8,972,984 B2 | 3/2015 | Meisner et al. |
| 8,988,970 B2 | 3/2015 | O'Donovan et al. |
| 9,002,998 B2 | 4/2015 | Master et al. |
| 9,015,093 B1 | 4/2015 | Commons |
| 9,036,902 B2 | 5/2015 | Nathan et al. |
| 9,047,090 B2 | 6/2015 | Kottilingal et al. |
| 9,053,562 B1 | 6/2015 | Rabin et al. |
| 9,064,496 B1 | 6/2015 | Wu |
| 9,075,697 B2 | 7/2015 | Powell et al. |
| 9,076,449 B2 | 7/2015 | Rathi |
| 9,105,083 B2 | 8/2015 | Rhoads et al. |
| 9,124,798 B2 | 9/2015 | Hanna |
| 9,124,850 B1 | 9/2015 | Stevenson et al. |
| 9,143,780 B1 | 9/2015 | Lewis et al. |
| 9,148,664 B1 | 9/2015 | Lewis et al. |
| 9,172,923 B1 | 10/2015 | Prins et al. |
| 9,183,580 B2 | 11/2015 | Rhoads et al. |
| 9,185,379 B2 | 11/2015 | Gould et al. |
| 9,202,254 B2 | 12/2015 | Rodriguez et al. |
| 9,210,266 B2 | 12/2015 | Lum et al. |
| 9,218,530 B2 | 12/2015 | Davis et al. |
| 9,225,822 B2 | 12/2015 | Davis et al. |
| 9,229,718 B2 | 1/2016 | Macy, Jr. et al. |
| 9,229,719 B2 | 1/2016 | Macy, Jr. et al. |
| 9,239,951 B2 | 1/2016 | Hoffberg et al. |
| 9,240,021 B2 | 1/2016 | Rodriguez |
| 9,247,226 B2 | 1/2016 | Gould et al. |
| 9,251,115 B2 | 2/2016 | Bursell |
| 9,251,783 B2 | 2/2016 | Kalinli-Akbacak et al. |
| 9,270,678 B2 | 2/2016 | Mazzaferri et al. |
| 9,292,895 B2 | 3/2016 | Rodriguez et al. |
| 9,293,109 B2 | 3/2016 | Duluk, Jr. et al. |
| 9,324,335 B2 | 4/2016 | Rathi |
| 9,330,427 B2 | 5/2016 | Conwell |
| 9,354,778 B2 | 5/2016 | Cornaby et al. |
| 9,361,259 B2 | 6/2016 | Kimura et al. |
| 9,367,886 B2 | 6/2016 | Davis et al. |
| 9,384,009 B2 | 7/2016 | Belmont et al. |
| 9,405,363 B2 | 8/2016 | Hernandez-Abrego et al. |
| 9,405,501 B2 | 8/2016 | Ahmed et al. |
| 9,411,983 B2 | 8/2016 | Mangalampalli et al. |
| 9,418,616 B2 | 8/2016 | Duluk, Jr. et al. |
| 9,424,618 B2 | 8/2016 | Rodriguez |
| 9,456,131 B2 | 9/2016 | Tran |
| 9,477,472 B2 | 10/2016 | Macy, Jr. et al. |
| 9,478,256 B1 | 10/2016 | Ju et al. |
| 9,484,046 B2 | 11/2016 | Knudson et al. |
| 9,495,526 B2 | 11/2016 | Hanna |
| 9,501,281 B2 | 11/2016 | Gopal et al. |
| 9,516,022 B2 | 12/2016 | Borzycki et al. |
| 9,520,128 B2 | 12/2016 | Bauer et al. |
| 9,535,563 B2 | 1/2017 | Hoffberg et al. |
| 9,547,873 B2 | 1/2017 | Rhoads |
| 9,552,130 B2 | 1/2017 | Momchilov |
| RE46,310 E | 2/2017 | Hoffberg et al. |
| 9,569,778 B2 | 2/2017 | Hanna |
| 9,575,765 B2 | 2/2017 | Forsyth et al. |
| 9,600,919 B1 | 3/2017 | Imbruce et al. |
| 9,632,792 B2 | 4/2017 | Forsyth et al. |
| 9,648,169 B2 | 5/2017 | Lum et al. |
| 9,667,985 B1 | 5/2017 | Prins et al. |
| 9,672,811 B2 | 6/2017 | Kalinli-Akbacak |
| 9,673,985 B2 | 6/2017 | Mangalampalli et al. |
| 9,678,753 B2 | 6/2017 | Macy, Jr. et al. |
| 9,692,908 B1 | 6/2017 | Wu |
| 9,706,292 B2 | 7/2017 | Duraiswami et al. |
| 9,720,692 B2 | 8/2017 | Julier et al. |
| 9,727,042 B2 | 8/2017 | Hoffberg-Borghesani et al. |
| 9,804,848 B2 | 10/2017 | Julier et al. |
| 9,824,668 B2 | 11/2017 | Deering et al. |
| 9,830,950 B2 | 11/2017 | Rodriguez et al. |
| 9,832,543 B1 | 11/2017 | Wu |
| 9,858,076 B2 | 1/2018 | Macy, Jr. et al. |
| 9,883,040 B2 | 1/2018 | Strong et al. |
| 9,888,051 B1 | 2/2018 | Rosenzweig et al. |
| 9,891,883 B2 | 2/2018 | Sharma et al. |
| 9,930,186 B2 | 3/2018 | Bandyopadhyay et al. |
| 9,940,922 B1 | 4/2018 | Schissler et al. |
| 9,977,644 B2 | 5/2018 | Schissler et al. |
| 9,986,324 B2 | 5/2018 | Pergament et al. |
| 10,003,550 B1 | 6/2018 | Babcock et al. |
| 10,038,783 B2 | 7/2018 | Wilcox et al. |
| 10,049,657 B2 | 8/2018 | Kalinli-Akbacak |
| 10,051,298 B2 | 8/2018 | Bear et al. |
| 10,055,733 B2 | 8/2018 | Hanna |
| 10,083,689 B2 | 9/2018 | Bocklet et al. |
| 10,127,042 B2 | 11/2018 | Yap et al. |
| 10,127,624 B1 | 11/2018 | Lassahn et al. |
| 10,127,925 B1 | 11/2018 | Wu |
| 10,141,009 B2 | 11/2018 | Khoury et al. |
| 10,141,033 B2 | 11/2018 | Hinton et al. |
| 10,142,463 B2 | 11/2018 | Douglas |
| 10,152,822 B2 | 12/2018 | Surti et al. |
| 10,153,011 B2 | 12/2018 | Hinton et al. |
| 10,157,162 B2 | 12/2018 | Chen |
| 10,163,468 B2 | 12/2018 | Hinton et al. |
| 10,166,999 B1 | 1/2019 | Weng |
| 10,170,115 B2 | 1/2019 | Bocklet et al. |
| 10,170,165 B2 | 1/2019 | Hinton et al. |
| 10,181,339 B2 | 1/2019 | Rodriguez et al. |
| 10,185,670 B2 | 1/2019 | Litichever et al. |
| 10,223,112 B2 | 3/2019 | Abraham et al. |
| 10,228,909 B2 | 3/2019 | Anderson et al. |
| 10,229,670 B2 | 3/2019 | You et al. |
| 10,255,911 B2 | 4/2019 | Malinowski et al. |
| 10,263,842 B2 | 4/2019 | Bursell |
| 10,275,216 B2 | 4/2019 | Anderson et al. |
| 10,306,249 B2 | 5/2019 | Prins et al. |
| 10,319,374 B2 | 6/2019 | Catanzaro et al. |
| 10,325,397 B2 | 6/2019 | Imbruce et al. |
| 10,331,451 B2 | 6/2019 | Yap et al. |
| 10,332,509 B2 | 6/2019 | Catanzaro et al. |
| 10,334,348 B2 | 6/2019 | Pergament et al. |
| 10,361,802 B1 | 7/2019 | Hoffberg-Borghesani et al. |
| 10,362,172 B2 | 7/2019 | Strong et al. |
| 10,376,785 B2 | 8/2019 | Hernandez-Abrego et al. |
| 10,382,623 B2 | 8/2019 | Lev-Tov et al. |
| 10,387,148 B2 | 8/2019 | Ould-Ahmed-Vall et al. |
| 10,387,149 B2 | 8/2019 | Ould-Ahmed-Vall et al. |
| 10,388,272 B1 | 8/2019 | Thomson et al. |
| 10,389,982 B1 | 8/2019 | Fu et al. |
| 10,389,983 B1 | 8/2019 | Fu et al. |
| 10,424,048 B1 | 9/2019 | Calhoun et al. |
| 10,424,289 B2 | 9/2019 | Kalinli-Akbacak |
| 10,425,222 B2 | 9/2019 | Gueron et al. |
| 10,447,468 B2 | 10/2019 | Gueron et al. |
| 10,452,398 B2 | 10/2019 | Hughes et al. |
| 10,452,555 B2 | 10/2019 | Hughes |
| 10,455,088 B2 | 10/2019 | Tapuhi et al. |
| 10,459,685 B2 | 10/2019 | Sharma et al. |
| 10,459,877 B2 | 10/2019 | Uliel et al. |
| 10,467,144 B2 | 11/2019 | Hughes |
| 10,469,249 B2 | 11/2019 | Gueron et al. |
| 10,469,664 B2 | 11/2019 | Pirat et al. |
| 10,474,466 B2 | 11/2019 | Macy, Jr. et al. |
| 10,476,667 B2 | 11/2019 | Gueron et al. |
| 10,482,177 B2 | 11/2019 | Hahn |
| 10,510,000 B1 | 12/2019 | Commons |
| 10,511,708 B2 | 12/2019 | Rangarajan et al. |
| 10,517,021 B2 | 12/2019 | Feldman et al. |
| 10,524,024 B1 | 12/2019 | Wu |
| 10,536,672 B2 | 1/2020 | Fu et al. |
| 10,536,673 B2 | 1/2020 | Noone |
| 10,542,135 B2 | 1/2020 | Douglas |
| 10,547,497 B1 | 1/2020 | Mostafa et al. |

(56) References Cited

U.S. PATENT DOCUMENTS

| | | | |
|---|---|---|---|
| 10,547,811 B2 | 1/2020 | Tran |
| 10,547,812 B2 | 1/2020 | Tran |
| 10,559,307 B1 | 2/2020 | Khaleghi |
| 10,565,354 B2 | 2/2020 | Ray et al. |
| 10,572,251 B2 | 2/2020 | Kapoor et al. |
| 10,573,312 B1 | 2/2020 | Thomson et al. |
| RE47,908 E | 3/2020 | Hoffberg et al. |
| 10,579,219 B2 | 3/2020 | Momchilov |
| 10,581,594 B2 | 3/2020 | Wolrich et al. |
| 10,587,800 B2 | 3/2020 | Boyce et al. |
| 10,650,807 B2 | 5/2020 | Bocklet et al. |
| 10,657,779 B2 | 5/2020 | Weber et al. |
| 10,658,007 B2 | 5/2020 | Davis et al. |
| RE48,056 E | 6/2020 | Hoffberg et al. |
| 10,672,383 B1 | 6/2020 | Thomson et al. |
| 10,678,851 B2 | 6/2020 | Tcherechansky et al. |
| 10,681,313 B1 | 6/2020 | Day |
| 10,687,145 B1 | 6/2020 | Campbell |
| 10,714,077 B2 | 7/2020 | Song et al. |
| 10,715,656 B2 | 7/2020 | Douglas |
| 10,715,793 B1 | 7/2020 | Rabin et al. |
| 10,719,433 B2 | 7/2020 | Lassahn et al. |
| 10,726,792 B2 | 7/2020 | Runyan et al. |
| 10,732,970 B2 | 8/2020 | Abraham et al. |
| 10,733,116 B2 | 8/2020 | Litichever et al. |
| 10,735,848 B2 | 8/2020 | Pergament et al. |
| 10,755,718 B2 | 8/2020 | Ge et al. |
| 10,757,161 B2 | 8/2020 | Murgia et al. |
| 10,777,050 B2 | 9/2020 | ap Dafydd et al. |
| 10,803,381 B2 | 10/2020 | Rozen et al. |
| 10,803,883 B1 | 10/2020 | Wu |
| 2002/0012398 A1 | 1/2002 | Zhou et al. |
| 2002/0022927 A1 | 2/2002 | Lemelson et al. |
| 2002/0064139 A1 | 5/2002 | Bist et al. |
| 2002/0072898 A1 | 6/2002 | Takamizawa |
| 2002/0085648 A1 | 7/2002 | Burns et al. |
| 2002/0095617 A1 | 7/2002 | Norman |
| 2002/0151992 A1 | 10/2002 | Hoffberg et al. |
| 2002/0165709 A1 | 11/2002 | Sadri et al. |
| 2003/0009656 A1 | 1/2003 | Yamamura |
| 2003/0105788 A1 | 6/2003 | Chatterjee |
| 2003/0115381 A1 | 6/2003 | Coles et al. |
| 2003/0151608 A1 | 8/2003 | Chung et al. |
| 2003/0179941 A1 | 9/2003 | DeCegama |
| 2003/0219034 A1 | 11/2003 | Lotter et al. |
| 2004/0001501 A1* | 1/2004 | Delveaux ............ H04L 12/4625 370/442 |
| 2004/0001704 A1 | 1/2004 | Chan et al. |
| 2004/0022416 A1 | 2/2004 | Lemelson et al. |
| 2004/0054878 A1* | 3/2004 | Debes .................. G06F 17/147 712/221 |
| 2004/0189720 A1 | 9/2004 | Wilson et al. |
| 2004/0233930 A1 | 11/2004 | Colby |
| 2004/0267856 A1* | 12/2004 | Macy, Jr. .............. G06F 9/3001 708/524 |
| 2005/0055208 A1 | 3/2005 | Kibkalo et al. |
| 2005/0062746 A1 | 3/2005 | Kataoka et al. |
| 2005/0071526 A1 | 3/2005 | Brokenshire et al. |
| 2005/0125369 A1 | 6/2005 | Buck et al. |
| 2005/0166227 A1 | 7/2005 | Joshi |
| 2005/0222841 A1 | 10/2005 | McDowell |
| 2005/0265577 A1 | 12/2005 | DeCegama |
| 2006/0100865 A1 | 5/2006 | Sadri et al. |
| 2006/0136712 A1 | 6/2006 | Nagendra et al. |
| 2006/0140098 A1 | 6/2006 | Champion et al. |
| 2006/0155398 A1 | 7/2006 | Hoffberg et al. |
| 2006/0193383 A1 | 8/2006 | Alvarez et al. |
| 2006/0200253 A1 | 9/2006 | Hoffberg et al. |
| 2006/0200259 A1 | 9/2006 | Hoffberg et al. |
| 2006/0212613 A1 | 9/2006 | Stewart |
| 2006/0239471 A1 | 10/2006 | Mao et al. |
| 2006/0253288 A1 | 11/2006 | Chu et al. |
| 2007/0024472 A1 | 2/2007 | Oh et al. |
| 2007/0027695 A1 | 2/2007 | Oh et al. |
| 2007/0050834 A1 | 3/2007 | Royo et al. |
| 2007/0053513 A1 | 3/2007 | Hoffberg |
| 2007/0061022 A1 | 3/2007 | Hoffberg-Borghesani et al. |
| 2007/0061023 A1 | 3/2007 | Hoffberg et al. |
| 2007/0061142 A1 | 3/2007 | Hernandez-Abrego et al. |
| 2007/0061735 A1 | 3/2007 | Hoffberg et al. |
| 2007/0070038 A1 | 3/2007 | Hoffberg et al. |
| 2007/0070079 A1 | 3/2007 | Chung et al. |
| 2007/0070734 A1 | 3/2007 | Hsu et al. |
| 2007/0106684 A1 | 5/2007 | Gould et al. |
| 2007/0110053 A1 | 5/2007 | Soni et al. |
| 2007/0113038 A1 | 5/2007 | Hobson et al. |
| 2007/0147568 A1 | 6/2007 | Harris et al. |
| 2007/0230586 A1 | 10/2007 | Shen et al. |
| 2007/0250681 A1 | 10/2007 | Horvath et al. |
| 2007/0286275 A1 | 12/2007 | Kimura et al. |
| 2008/0059763 A1 | 3/2008 | Bivolarski |
| 2008/0068389 A1 | 3/2008 | Bakalash et al. |
| 2008/0089672 A1 | 4/2008 | Gould et al. |
| 2008/0092049 A1 | 4/2008 | Gould et al. |
| 2008/0133895 A1 | 6/2008 | Sivtsov et al. |
| 2008/0163255 A1 | 7/2008 | Munoz et al. |
| 2008/0168443 A1 | 7/2008 | Brokenshire et al. |
| 2008/0193050 A1 | 8/2008 | Weybrew |
| 2008/0214253 A1 | 9/2008 | Gillo et al. |
| 2008/0215679 A1 | 9/2008 | Gillo et al. |
| 2008/0215971 A1 | 9/2008 | Gillo et al. |
| 2008/0215972 A1 | 9/2008 | Zalewski et al. |
| 2008/0226119 A1 | 9/2008 | Candelore et al. |
| 2008/0235582 A1 | 9/2008 | Zalewski et al. |
| 2008/0281915 A1 | 11/2008 | Elad et al. |
| 2009/0016691 A1 | 1/2009 | Gould et al. |
| 2009/0028347 A1 | 1/2009 | Duraiswami et al. |
| 2009/0055744 A1 | 2/2009 | Sawada et al. |
| 2009/0119379 A1 | 5/2009 | Read et al. |
| 2009/0132243 A1 | 5/2009 | Suzuki |
| 2009/0154690 A1 | 6/2009 | Wu |
| 2009/0160863 A1 | 6/2009 | Frank |
| 2009/0196280 A1 | 8/2009 | Rofougaran |
| 2009/0197642 A1 | 8/2009 | Rofougaran et al. |
| 2009/0198855 A1 | 8/2009 | Rofougaran et al. |
| 2009/0208189 A1 | 8/2009 | Sasaki et al. |
| 2009/0216641 A1 | 8/2009 | Hubbard |
| 2009/0238479 A1 | 9/2009 | Jaggi et al. |
| 2009/0259463 A1 | 10/2009 | Sadri et al. |
| 2009/0265523 A1 | 10/2009 | Macy, Jr. et al. |
| 2009/0268945 A1 | 10/2009 | Wilson et al. |
| 2009/0274202 A1 | 11/2009 | Hanke et al. |
| 2009/0276606 A1 | 11/2009 | Mimar |
| 2009/0316798 A1 | 12/2009 | Mimar |
| 2009/0327661 A1 | 12/2009 | Sperber et al. |
| 2010/0011042 A1 | 1/2010 | Debes et al. |
| 2010/0054701 A1 | 3/2010 | DeCegama |
| 2010/0070904 A1 | 3/2010 | Zigon et al. |
| 2010/0076642 A1 | 3/2010 | Hoffberg et al. |
| 2010/0092156 A1 | 4/2010 | McCrossan et al. |
| 2010/0104263 A1 | 4/2010 | McCrossan et al. |
| 2010/0111429 A1 | 5/2010 | Wang et al. |
| 2010/0198592 A1 | 8/2010 | Potter |
| 2010/0208905 A1 | 8/2010 | Franck et al. |
| 2010/0211391 A1 | 8/2010 | Chen |
| 2010/0217835 A1 | 8/2010 | Rofougaran |
| 2010/0232370 A1 | 9/2010 | Jing et al. |
| 2010/0232371 A1 | 9/2010 | Jing et al. |
| 2010/0232396 A1 | 9/2010 | Jing et al. |
| 2010/0232447 A1 | 9/2010 | Jing et al. |
| 2010/0257089 A1 | 10/2010 | Johnson |
| 2011/0043518 A1 | 2/2011 | Von Borries et al. |
| 2011/0054915 A1 | 3/2011 | Oh et al. |
| 2011/0066578 A1 | 3/2011 | Chong et al. |
| 2011/0082877 A1 | 4/2011 | Gupta et al. |
| 2011/0103488 A1 | 5/2011 | Xue et al. |
| 2011/0145184 A1 | 6/2011 | You et al. |
| 2011/0156896 A1 | 6/2011 | Hoffberg et al. |
| 2011/0167110 A1 | 7/2011 | Hoffberg et al. |
| 2011/0222372 A1 | 9/2011 | O'Donovan et al. |
| 2011/0314093 A1 | 12/2011 | Sheu et al. |
| 2012/0011170 A1 | 1/2012 | Elad et al. |
| 2012/0028712 A1 | 2/2012 | Zuili |
| 2012/0036016 A1 | 2/2012 | Hoffberg et al. |

(56) References Cited

U.S. PATENT DOCUMENTS

| | | |
|---|---|---|
| 2012/0116559 A1 | 5/2012 | Davis et al. |
| 2012/0134548 A1 | 5/2012 | Rhoads et al. |
| 2012/0150651 A1 | 6/2012 | Hoffberg et al. |
| 2012/0166187 A1 | 6/2012 | Van Buskirk et al. |
| 2012/0208592 A1 | 8/2012 | Davis et al. |
| 2012/0210233 A1 | 8/2012 | Davis et al. |
| 2012/0224743 A1 | 9/2012 | Rodriguez et al. |
| 2012/0253812 A1 | 10/2012 | Kalinli et al. |
| 2012/0259638 A1 | 10/2012 | Kalinli |
| 2012/0268241 A1 | 10/2012 | Hanna et al. |
| 2012/0277893 A1 | 11/2012 | Davis et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0288114 A1 | 11/2012 | Duraiswami et al. |
| 2012/0293643 A1 | 11/2012 | Hanna |
| 2012/0297383 A1 | 11/2012 | Meisner et al. |
| 2013/0006617 A1 | 1/2013 | Sadri et al. |
| 2013/0018701 A1 | 1/2013 | Dusig et al. |
| 2013/0031177 A1 | 1/2013 | Willis et al. |
| 2013/0086185 A1 | 4/2013 | Desmarais et al. |
| 2013/0138589 A1 | 5/2013 | Yu et al. |
| 2013/0145180 A1 | 6/2013 | Branover et al. |
| 2013/0152002 A1 | 6/2013 | Menczel et al. |
| 2013/0162752 A1 | 6/2013 | Herz et al. |
| 2013/0169838 A1 | 7/2013 | Rodriguez et al. |
| 2013/0183952 A1 | 7/2013 | Davis et al. |
| 2013/0243203 A1 | 9/2013 | Franck et al. |
| 2013/0298033 A1 | 11/2013 | Momchilov |
| 2013/0317816 A1 | 11/2013 | Potter |
| 2014/0032624 A1 | 1/2014 | Zohar et al. |
| 2014/0032881 A1 | 1/2014 | Zohar et al. |
| 2014/0046673 A1 | 2/2014 | Rathi |
| 2014/0047251 A1 | 2/2014 | Kottilingal et al. |
| 2014/0053161 A1 | 2/2014 | Sadowski |
| 2014/0055559 A1 | 2/2014 | Huang et al. |
| 2014/0085501 A1 | 3/2014 | Tran |
| 2014/0105022 A1 | 4/2014 | Soni et al. |
| 2014/0109210 A1 | 4/2014 | Borzycki et al. |
| 2014/0126715 A1 | 5/2014 | Lum et al. |
| 2014/0149112 A1 | 5/2014 | Kalinli-Akbacak |
| 2014/0156274 A1 | 6/2014 | You et al. |
| 2014/0173452 A1 | 6/2014 | Hoffberg et al. |
| 2014/0176588 A1 | 6/2014 | Duluk, Jr. et al. |
| 2014/0176589 A1 | 6/2014 | Duluk, Jr. et al. |
| 2014/0189231 A1 | 7/2014 | Maydan et al. |
| 2014/0211718 A1 | 7/2014 | Jing et al. |
| 2014/0258446 A1 | 9/2014 | Bursell |
| 2014/0289816 A1 | 9/2014 | Mazzaferri et al. |
| 2014/0300758 A1 | 10/2014 | Tran |
| 2014/0310442 A1 | 10/2014 | Kimura et al. |
| 2014/0320021 A1 | 10/2014 | Conwell |
| 2014/0324596 A1 | 10/2014 | Rodriguez |
| 2014/0324833 A1 | 10/2014 | Davis et al. |
| 2014/0347272 A1 | 11/2014 | Hernandez-Abrego et al. |
| 2014/0357312 A1 | 12/2014 | Davis et al. |
| 2014/0369550 A1 | 12/2014 | Davis et al. |
| 2015/0019530 A1 | 1/2015 | Felch |
| 2015/0063557 A1 | 3/2015 | Lum et al. |
| 2015/0072728 A1 | 3/2015 | Rodriguez et al. |
| 2015/0073794 A1 | 3/2015 | Kalinli-Akbacak et al. |
| 2015/0089197 A1 | 3/2015 | Gopal et al. |
| 2015/0100809 A1 | 4/2015 | Belmont et al. |
| 2015/0121039 A1 | 4/2015 | Macy, Jr. et al. |
| 2015/0142618 A1 | 5/2015 | Rhoads et al. |
| 2015/0154023 A1 | 6/2015 | Macy, Jr. et al. |
| 2015/0163345 A1 | 6/2015 | Cornaby et al. |
| 2015/0178081 A1 | 6/2015 | Julier et al. |
| 2015/0178084 A1 | 6/2015 | Julier et al. |
| 2015/0193194 A1 | 7/2015 | Ahmed et al. |
| 2015/0256677 A1 | 9/2015 | Konig et al. |
| 2015/0281853 A1 | 10/2015 | Eisner et al. |
| 2015/0286873 A1 | 10/2015 | Davis et al. |
| 2015/0310872 A1 | 10/2015 | Rathi |
| 2016/0034248 A1 | 2/2016 | Schissler et al. |
| 2016/0086600 A1 | 3/2016 | Bauer et al. |
| 2016/0094491 A1 | 3/2016 | Fedorov et al. |
| 2016/0103788 A1 | 4/2016 | Forsyth et al. |
| 2016/0104165 A1 | 4/2016 | Hanna |
| 2016/0110196 A1 | 4/2016 | Forsyth et al. |
| 2016/0127184 A1 | 5/2016 | Bursell |
| 2016/0165051 A1 | 6/2016 | Lum et al. |
| 2016/0247160 A1 | 8/2016 | Hanna |
| 2016/0254006 A1 | 9/2016 | Rathi |
| 2016/0310847 A1 | 10/2016 | Hernandez-Abrego et al. |
| 2016/0322082 A1 | 11/2016 | Davis et al. |
| 2016/0337426 A1 | 11/2016 | Shribman et al. |
| 2016/0378427 A1 | 12/2016 | Sharma et al. |
| 2017/0019660 A1 | 1/2017 | Deering et al. |
| 2017/0025119 A1 | 1/2017 | Song et al. |
| 2017/0038929 A1 | 2/2017 | Momchilov |
| 2017/0060857 A1 | 3/2017 | Imbruce et al. |
| 2017/0109162 A1 | 4/2017 | Yap et al. |
| 2017/0111506 A1 | 4/2017 | Strong et al. |
| 2017/0111515 A1 | 4/2017 | Bandyopadhyay et al. |
| 2017/0147343 A1 | 5/2017 | Yap et al. |
| 2017/0148431 A1 | 5/2017 | Catanzaro et al. |
| 2017/0148433 A1 | 5/2017 | Catanzaro et al. |
| 2017/0192785 A1 | 7/2017 | Uliel et al. |
| 2017/0193685 A1 | 7/2017 | Imbruce et al. |
| 2017/0220929 A1 | 8/2017 | Rozen et al. |
| 2017/0236006 A1 | 8/2017 | Davis et al. |
| 2017/0238002 A1 | 8/2017 | Prins et al. |
| 2017/0251295 A1 | 8/2017 | Pergament et al. |
| 2017/0263240 A1 | 9/2017 | Kalinli-Akbacak |
| 2017/0323638 A1 | 11/2017 | Malinowski et al. |
| 2017/0351664 A1 | 12/2017 | Hahn |
| 2017/0371829 A1 | 12/2017 | Chen |
| 2018/0007587 A1 | 1/2018 | Feldman et al. |
| 2018/0039497 A1 | 2/2018 | Ould-Ahmed-Vall et al. |
| 2018/0041631 A1 | 2/2018 | Douglas |
| 2018/0052686 A1 | 2/2018 | Ould-Ahmed-Vall et al. |
| 2018/0063325 A1 | 3/2018 | Wilcox et al. |
| 2018/0077380 A1 | 3/2018 | Tran |
| 2018/0088943 A1 | 3/2018 | Abraham et al. |
| 2018/0115751 A1 | 4/2018 | Noone |
| 2018/0122429 A1 | 5/2018 | Hinton et al. |
| 2018/0122430 A1 | 5/2018 | Hinton et al. |
| 2018/0122432 A1 | 5/2018 | Hinton et al. |
| 2018/0122433 A1 | 5/2018 | Hinton et al. |
| 2018/0144435 A1 | 5/2018 | Chen et al. |
| 2018/0152561 A1 | 5/2018 | Strong et al. |
| 2018/0158463 A1 | 6/2018 | Ge et al. |
| 2018/0174620 A1 | 6/2018 | Davis et al. |
| 2018/0182388 A1 | 6/2018 | Bocklet et al. |
| 2018/0198838 A1 | 7/2018 | Murgia et al. |
| 2018/0225091 A1 | 8/2018 | Anderson et al. |
| 2018/0225092 A1 | 8/2018 | Anderson et al. |
| 2018/0225217 A1 | 8/2018 | Hughes |
| 2018/0225218 A1 | 8/2018 | Hughes |
| 2018/0225230 A1 | 8/2018 | Litichever et al. |
| 2018/0246696 A1 | 8/2018 | Sharma et al. |
| 2018/0261187 A1 | 9/2018 | Barylski et al. |
| 2018/0270347 A1 | 9/2018 | Rangarajan et al. |
| 2018/0279036 A1 | 9/2018 | Pergament et al. |
| 2018/0286105 A1 | 10/2018 | Surti et al. |
| 2018/0293362 A1 | 10/2018 | Ray et al. |
| 2018/0295282 A1 | 10/2018 | Boyce et al. |
| 2018/0299841 A1 | 10/2018 | Appu et al. |
| 2018/0300617 A1 | 10/2018 | McBride et al. |
| 2018/0301095 A1 | 10/2018 | Runyan et al. |
| 2018/0309927 A1 | 10/2018 | Tanner et al. |
| 2018/0322876 A1 | 11/2018 | Bocklet et al. |
| 2018/0336464 A1 | 11/2018 | Karras et al. |
| 2018/0353145 A1 | 12/2018 | Simon et al. |
| 2019/0005943 A1 | 1/2019 | Kalinli-Akbacak |
| 2019/0036684 A1 | 1/2019 | Gueron et al. |
| 2019/0043488 A1 | 2/2019 | Booklet et al. |
| 2019/0065185 A1 | 2/2019 | Kuo |
| 2019/0082990 A1 | 3/2019 | Poltorak |

(56) References Cited

U.S. PATENT DOCUMENTS

| | | |
|---|---|---|
| 2019/0087359 A1 | 3/2019 | Litichever et al. |
| 2019/0087929 A1 | 3/2019 | Lassahn et al. |
| 2019/0102187 A1 | 4/2019 | Abraham et al. |
| 2019/0108030 A1 | 4/2019 | Corbal San Adrian et al. |
| 2019/0109703 A1 | 4/2019 | Gueron et al. |
| 2019/0109704 A1 | 4/2019 | Gueron et al. |
| 2019/0109705 A1 | 4/2019 | Gueron et al. |
| 2019/0114176 A1 | 4/2019 | Shifer et al. |
| 2019/0116025 A1 | 4/2019 | Wolrich et al. |
| 2019/0121643 A1 | 4/2019 | Hughes et al. |
| 2019/0130278 A1 | 5/2019 | Karras et al. |
| 2019/0140978 A1 | 5/2019 | Babcock et al. |
| 2019/0141184 A1 | 5/2019 | Douglas |
| 2019/0147856 A1 | 5/2019 | Price et al. |
| 2019/0147884 A1 | 5/2019 | Hirani et al. |
| 2019/0199590 A1 | 6/2019 | Bursell |
| 2019/0201691 A1 | 7/2019 | Poltorak |
| 2019/0222619 A1 | 7/2019 | Shribman et al. |
| 2019/0224441 A1 | 7/2019 | Poltorak |
| 2019/0227765 A1 | 7/2019 | Soifer et al. |
| 2019/0237108 A1 | 8/2019 | Davis et al. |
| 2019/0238954 A1 | 8/2019 | Dawson |
| 2019/0244225 A1 | 8/2019 | Ravichandran |
| 2019/0244611 A1 | 8/2019 | Godambe et al. |
| 2019/0244613 A1 | 8/2019 | Jonas et al. |
| 2019/0247662 A1 | 8/2019 | Poltroak |
| 2019/0286441 A1 | 9/2019 | Abraham et al. |
| 2019/0286444 A1 | 9/2019 | Kapoor et al. |
| 2019/0294972 A1 | 9/2019 | Keller et al. |
| 2019/0324752 A1 | 10/2019 | Julier et al. |
| 2019/0327449 A1 | 10/2019 | Fu et al. |
| 2019/0332694 A1 | 10/2019 | Tcherechansky et al. |
| 2019/0332869 A1 | 10/2019 | Varerkar et al. |
| 2019/0342452 A1 | 11/2019 | Strong et al. |
| 2019/0349472 A1 | 11/2019 | Douglas |
| 2019/0362461 A1 | 11/2019 | George et al. |
| 2019/0370644 A1 | 12/2019 | Kenney et al. |
| 2019/0378383 A1 | 12/2019 | Buttner et al. |
| 2019/0379342 A1 | 12/2019 | Weber et al. |
| 2019/0379964 A1 | 12/2019 | Pergament et al. |
| 2019/0379976 A1 | 12/2019 | ap Dafydd et al. |
| 2019/0379977 A1 | 12/2019 | Buttner et al. |
| 2020/0120307 A1 | 4/2020 | Tran |
| 2020/0133625 A1 | 4/2020 | Sharma et al. |
| 2020/0137635 A1 | 4/2020 | Feldman et al. |
| 2020/0151559 A1 | 5/2020 | Karras et al. |
| 2020/0175961 A1 | 6/2020 | Thomson et al. |
| 2020/0175962 A1 | 6/2020 | Thomson et al. |
| 2020/0175987 A1 | 6/2020 | Thomson et al. |
| 2020/0210473 A1 | 7/2020 | Tcherechansky et al. |
| 2020/0215433 A1 | 7/2020 | Ahmed et al. |
| 2020/0220916 A1 | 7/2020 | Ahmed et al. |
| 2020/0222010 A1 | 7/2020 | Howard |
| 2020/0226451 A1 | 7/2020 | Liu et al. |
| 2020/0243094 A1 | 7/2020 | Thomson et al. |
| 2020/0258516 A1 | 8/2020 | Khaleghi |
| 2020/0265859 A1 | 8/2020 | LaBosco et al. |
| 2020/0272976 A1 | 8/2020 | Murison et al. |
| 2020/0275201 A1 | 8/2020 | LaBosco |
| 2020/0275202 A1 | 8/2020 | LaBosco |
| 2020/0275203 A1 | 8/2020 | LaBosco |
| 2020/0275204 A1 | 8/2020 | LaBosco |
| 2020/0302612 A1 | 9/2020 | Marrero et al. |
| 2020/0314569 A1 | 10/2020 | Morgan et al. |
| 2020/0320023 A1 | 10/2020 | Litichever et al. |
| 2020/0320177 A1 | 10/2020 | Ray et al. |

\* cited by examiner

PARALLEL SIGNAL PROCESSING SYSTEM AND METHOD

RELATED APPLICATIONS

The present application is a:

Division of U.S. patent application Ser. No. 16/186,252, filed Nov. 9, 2018, now U.S. Pat. No. 10,803,883, issued Oct. 13, 2020, which is a Continuation of U.S. patent application Ser. No. 15/633, 211, filed Jun. 26, 2017, now U.S. Pat. No. 10,127,925, issued Nov. 13, 2018, which is a Continuation of U.S. patent application Ser. No. 14/744, 377, filed Jun. 19, 2016, now U.S. Pat. No. 9,692,908, issued Jun. 27, 2017, which is a Division of U.S. patent application Ser. No. 13/968,522, filed Aug. 16, 2013, now U.S. Pat. No. 9,064,496, issued Jun. 23, 2015, which is a Division of U.S. patent application Ser. No. 12/337,236, filed Dec. 17, 2008, now U.S. Pat. No. 8,515,052, issued Aug. 20, 2013, which is a Nonprovisional of, and Claims benefit of priority from U.S. Provisional Patent Application No. 61/014,106, filed Dec. 17, 2007, the entirety of which are each expressly incorporated herein by reference.

BACKGROUND

Field of the Invention

The invention relates to the field of real time digital audio processing, particularly in a telephony switch context.

Background of the Invention

Existing telephone systems, such as the Calltrol Object Telephony Server (OTS™), tend to require relatively expensive special purpose hardware to process hundreds of voice channels simultaneously. More information about this system can be found at www.calltrol.com/newsolutionsforoldchallenges.pdf, www.calltrol.com/crmconvergence_saleslogix.pdf, and www.calltrol.com/CalltrolSDKWhitepaper6-02.pdf, each of which is expressly incorporated herein by reference in its entirety.

In many traditional systems, a single dedicated analog or digital circuit is provided for each public switch telephone network (PSTN) line. See, e.g., Consumer Microcircuits Limited CMX673 datasheet, Clare M-985-01 datasheet. In other types of systems, the call progress tone analyzer may be statistically shared between multiple channels, imposing certain limitations and detection latencies.

Digital signal processor algorithms are also known for analyzing call progress tones (CPT). See, e.g., Manish Marwah and Sharmistha Das, "UNICA—A Unified Classification Algorithm For Call Progress Tones" (Avaya Labs, University of Colorado), expressly incorporated herein by reference.

Call progress tone signals provide information regarding the status or progress of a call to customers, operators, and connected equipment. In circuit-associated signaling, these audible tones are transmitted over the voice path within the frequency limits of the voice band. The four most common call progress tones are: Dial tone; Busy tone; Audible ringback; and Reorder tone. In addition to these, there are a number of other defined tones, including for example the 12 DTMF codes on a normal telephone keypad. There may be, for example, about 53 different tones supported by a system.

A call progress tone detector, may additionally respond to cue indicating Cessation of ringback; Presence/cessation of voice; Special Information Tones (SITs); and Pager cue tones. Collectively, call progress tones and these other audible signals are referred to as call progress events. Call progress tone generation/detection in the network is generally based on a Precise Tone Plan. In the plan, four distinctive tones are used singly or in combination to produce unique progress tone signals. These tones are 350 Hz, 440 Hz, 480 Hz and 620 Hz. Each call progress tone is defined by the frequencies used and a specific on/off temporal pattern.

The ITU-T E.180 and E.182 recommendations define the technical characteristics and intended usage of some of these tones: busy tone or busy signal; call waiting tone; comfort tone; conference call tone; confirmation tone; congestion tone; dial tone; end of three-party service tone (three-way calling); executive override tone; holding tone; howler tone; intercept tone; intrusion tone; line lock-out tone; negative indication tone; notify tone; number unobtainable tone; pay tone; payphone recognition tone; permanent signal tone; preemption tone; queue tone; recall dial tone; record tone; ringback tone or ringing tone; ringtone or ringing signal; second dial tone; special dial tone; special information tone (SIT); waiting tone; warning tone; Acceptance tone; Audible ring tone; Busy override warning tone; Busy verification tone; Engaged tone; Facilities tone; Fast busy tone; Function acknowledge tone; Identification tone; Intercept tone; Permanent signal tone; Positive indication tone; Re-order tone; Refusal tone; Ringback tone; Route tone; Service activated tone; Special ringing tone; Stutter dial tone; Switching tone; Test number tone; Test tone; and Trunk offering tone. In addition, signals sent to the PSTN include Answer tone; Calling tone; Guard tone; Pulse (loop disconnect) dialing; Tone (DTMF) dialing, and other signals from the PSTN include Billing (metering) signal; DC conditions; and Ringing signal. The tones, cadence, and tone definitions, may differ between different countries, carriers, types of equipment, etc. See, e.g., Annex to ITU Operational Bulletin No. 781-1.11.2003. Various Tones Used In National Networks (According To ITU-T Recommendation E.180) (03/1998).

Characteristics for the call progress events are shown in Table 1.

TABLE 1

| Call Progress Event Characteristics Name | Frequencies (Hz) | Temporal Pattern | Event Reported After |
|---|---|---|---|
| Dial Tone | 350 + 440 | Steady tone | Approximately 0.75 seconds |
| Busy Tone | 480 + 620 | 0.5 seconds on/ 0.5 seconds off | 2 cycles of precise, 3 cycles of nonprecise |
| Detection Audible Ringback | 440 + 480 | 2 seconds on/ 4 seconds off | 2 cycles of precise or nonprecise |
| Cessation | — | — | 3 to 6.5 seconds after ringback detected |
| Reorder | 480 + 620 | 0.25 seconds on/ 0.25 seconds off | 2 cycles of precise, 3 cycles of nonprecise |
| Detection Voice | 200 to 3400 | — | Approximately 0.25 to 0.50 seconds |
| Cessation | — | — | Approximately 0.5 to 1.0 seconds after voice detected |
| Special Information Tones (SITs) | See Table 2. | See Table 2. | Approximately 0.25 to 0.75 seconds |

TABLE 1-continued

| Call Progress Event Characteristics Name | Frequencies (Hz) | Temporal Pattern | Event Reported After |
|---|---|---|---|
| Pager Cue Tones | 1400 | 3 to 4 tones at 0.1 to 0.125 intervals | 2 cycles of precise or any pattern of 1400-Hz signals |

Dial tone indicates that the CO is ready to accept digits from the subscriber. In the precise tone plan, dial tone consists of 350 Hz plus 440 Hz. The system reports the presence of precise dial tone after approximately 0.75 seconds of steady tone. Nonprecise dial tone is reported after the system detects a burst of raw energy lasting for approximately 3 seconds.

Busy tone indicates that the called line has been reached but it is engaged in another call. In the precise tone plan, busy tone consists of 480 Hz plus 620 Hz interrupted at 60 ipm (interruptions per minute) with a 0.5 seconds on/0.5 seconds off temporal pattern. The system reports the presence of precise busy tone after approximately two cycles of this pattern. Nonprecise busy tone is reported after three cycles.

Audible ringback (ring tone) is returned to the calling party to indicate that the called line has been reached and power ringing has started. In the precise tone plan, audible ringback consists of 440 Hz plus 480 Hz with a 2 seconds on/4 seconds off temporal pattern. The system reports the presence of precise audible ringback after two cycles of this pattern.

Outdated equipment in some areas may produce nonprecise, or dirty ringback. Nonprecise ringback is reported after two cycles of a 1 to 2.5 seconds on, 2.5 to 4.5 seconds off pattern of raw energy. The system may report dirty ringback as voice detection, unless voice detection is specifically ignored during this period. The system reports ringback cessation after 3 to 6.5 seconds of silence once ringback has been detected (depending at what point in the ringback cycle the CPA starts listening).

Reorder (Fast Busy) tone indicates that the local switching paths to the calling office or equipment serving the customer are busy or that a toll circuit is not available. In the precise tone plan, reorder consists of 480 Hz plus 620 Hz interrupted at 120 ipm (interruptions per minute) with a 0.25 seconds on/0.25 seconds off temporal pattern. The system reports the presence of precise reorder tone after two cycles of this pattern. Nonprecise reorder tone is reported after three cycles.

Voice detection has multiple uses, and can be used to detect voice as an answer condition, and also to detect machine-generated announcements that may indicate an error condition. Voice presence can be detected after approximately 0.25 to 0.5 seconds of continuous human speech falling within the 200-Hz to 3400-Hz voiceband (although the PSTN only guarantees voice performance between 300 Hz to 800 Hz. A voice cessation condition may be determined, for example, after approximately 0.5 to 1.0 seconds of silence once the presence of voice has been detected.

Special Information Tones (SITs) indicate network conditions encountered in both the Local Exchange Carrier (LEC) and Inter-Exchange Carrier (IXC) networks. The tones alert the caller that a machine-generated announcement follows (this announcement describes the network condition). Each SIT consists of a precise three-tone sequence: the first tone is either 913.8 Hz or 985.2 Hz, the second tone is either 1370.6 Hz or 1428.5 Hz, and the third is always 1776.7 Hz. The duration of the first and second tones can be either 274 ms or 380 ms, while the duration of the third remains a constant 380 ms. The names, descriptions and characteristics of the four most common SITs are summarized in Table 2.

TABLE 2

| Special Information Tones (SITs) | | First Tone Frequency Duration | | Second Tone Frequency Duration | | Third Tone Frequency Duration | |
|---|---|---|---|---|---|---|---|
| Name | Description | (Hz) | (ms) | (Hz) | (ms) | (Hz) | (ms) |
| NC[1] | No circuit found | 985.2 | 380 | 1428.5 | 380 | 1776.7 | 380 |
| IC | Operator intercept | 913.8 | 274 | 1370.6 | 274 | 1776.7 | 380 |
| VC | Vacant circuit (non-registered number) | 985.2 | 380 | 1370.6 | 274 | 1776.7 | 380 |
| RO[1] | Reorder (system busy) | 913.8 | 274 | 1428.5 | 380 | 1776.7 | 380 |

[1]Tone frequencies shown indicate conditions that are the responsibility of the BOC intra-LATA carrier. Conditions occurring on inter-LATA carriers generate SITs with different first and second tone frequencies Pager cue tones are used by pager terminal equipment to signal callers or connected equipment to enter the callback number (this number is then transmitted to the paged party). Most pager terminal equipment manufacturers use a 3- or 4-tone burst of 1400 Hz at 100- to 125-ms intervals. The system identifies three cycles of 1400 Hz at these approximate intervals as pager cue tones. To accommodate varying terminal equipment signals, tone bursts of 1400 Hz in a variety of patterns may also be reported as pager cue tones. Voice prompts sometimes accompany pager cue tones to provide instructions. Therefore, combinations of prompts and tones may be detected by configuring an answer supervision template to respond to both voice detection and pager cue tone detection.

A Goertzel filter algorithm may be used to detect the solid tones that begin fax or data-modem calls. If any of the following tones are detected, a "modem" (fax or data) state is indicated: 2100 Hz, 2225 Hz, 1800 Hz, 2250 Hz, 1300 Hz, 1400 Hz, 980 Hz, 1200 Hz, 600 Hz, or 3000 Hz. Fax detection relies on the 1.5 seconds of HDLC flags that precede the answering fax terminal's DIS frame. DIS is used by the answering terminal to declare its capabilities. After a solid tone is detected, a V.21 receiver is used to detect the HDLC flags (01111110) in the preamble of DIS signal on the downstream side. If the required number of flags are detected, fax is reported. Otherwise, upon expiration of a timer, the call is may be determined to be a data modem communication. See, e.g., U.S. Pat. No. 7,003,093, the entirety of which is expressly incorporated herein by reference. See also, U.S. Pat. No. 7,043,006, expressly incorporated herein by reference.

Therefore, a well-developed system exists for in-band signaling over audio channels, with a modest degree of complexity and some variability between standards, which themselves may change over time.

One known digital signal processor architecture, exemplified by the nVidia Tesla™ C870 GPU device, provides a massively multi-threaded architecture, providing over 500 gigaflops peak floating-point performance. This device encompasses a 128-processor computing core, and is typically provided as a coprocessor on a high speed bus for a standard personal computer platform. Similarly, the AMD/ATI Firestream 9170 also reports 500 gigaflops performance from a GPU-type device with double precision floating point capability. Likewise, newly described devices (e.g., AMD Fusion) integrate a CPU and GPU on a single die with shared external interfaces. See, for example, www.nvidia.com/object/tesla_product_literature.html, S1070 1U System Specification Document (2.03 MB PDF), NVIDIA Tesla S1070 Datasheet (258 KB PDF), NVIDIA Tesla Personal Supercomputer Datasheet (517 KB PDF), C1060 Board Specification Document (514 KB PDF), NVIDIA Tesla C1060 Datasheet (153 KB PDF), NVIDIA Tesla 8 Series Product Overview (1.69 MB PDF), C870 Board Specification Document (478 KB PDF), D870 System Specification Document (630 KB PDF), 5870 1U Board Specification Document (13.3 MB PDF), NVIDIA Tesla 8 Series: GPU Computing Technical Brief (3.73 MB PDF), www.nvidia.com/object/cuda_programming_tools.html (PTX: Parallel Thread Execution ISA Version 1.2), developer.download.nvidia.com/compute/cuda/2_0/docs/ NVIDIA_CUDA_Programming_Guide_2.0.pdf, developer.download.nvidia.com/compute/cuda/2_0/docs/ CudaReferenceManual_2.0.pdf, developer.download.nvidia.com/compute/cuda/2_0/docs/ CUBLAS_Library_2.0.pdf, developer.download.nvidia.com/compute/cuda/2_0/docs/ CUFFT_Library_2.0.pdf, each of which is expressly incorporated herein by reference in its entirety.

The nVidia Tesla™ GPU is supported by the Compute Unified Device Architecture (CUDA) software development environment, which provides C language support. Typical applications proposed for the nVidia Tesla™ GPU, supported by CUDA, are Parallel bitonic sort; Matrix multiplication; Matrix transpose; Performance profiling using timers; Parallel prefix sum (scan) of large arrays; Image convolution; 1D DWT using Haar wavelet; OpenGL and Direct3D graphics interoperation examples; Basic Linear Algebra Subroutines; Fast Fourier Transform; Binomial Option Pricing; Black-Scholes Option Pricing; Monte-Carlo Option Pricing; Parallel Mersenne Twister (random number generation); Parallel Histogram; Image Denoising; and a Sobel Edge Detection Filter. Therefore, the typical proposed applications are computer software profiling, matrix applications, image processing applications, financial applications, Seismic simulations; Computational biology; Pattern recognition; Signal processing; and Physical simulation. CUDA technology offers the ability for threads to cooperate when solving a problem. The nVidia Tesla™ GPUs featuring CUDA technology have an on-chip Parallel Data Cache that can store information directly on the GPU, allowing computing threads to instantly share information rather than wait for data from much slower, off-chip DRAMs. Likewise, the software compile aspects of CUDA are able to partition code between the GPU and a host processor, for example to effect data transfers and to execute on the host processor algorithms and code which are incompatible or unsuitable for efficient execution on the GPU itself.

GPU architectures are generally well-suited to address problems that can be expressed as data-parallel computations: the same program is executed on many data elements in parallel, with high arithmetic intensity, the ratio of arithmetic operations to memory operations. Because the same program is executed for each data element, there is a lower requirement for sophisticated flow control; and because it is executed on many data elements and has high arithmetic intensity, the memory access latency can be hidden with calculations instead of big data caches. Thus, the GPU architecture typically provides a larger number of arithmetic logic units than independently and concurrently operable instruction decoders. Data-parallel processing maps data elements to parallel processing threads. Many applications that process large data sets such as arrays can use a data-parallel programming model to speed up the computations. In 3D rendering large sets of pixels and vertices are mapped to parallel threads. Similarly, image and media processing applications such as post-processing of rendered images, video encoding and decoding, image scaling, stereo vision, and pattern recognition can map image blocks and pixels to parallel processing threads. In fact, many algorithms outside the field of image rendering and processing are accelerated by data-parallel processing, from general signal processing or physics simulation to computational finance or computational biology.

The Tesla™ GPU device is implemented as a set of multiprocessors (e.g., 8 on the C870 device), each of which has a Single Instruction, Multiple Data architecture (SIMD): At any given clock cycle, each processor (16 per multiprocessor on the C870) of the multiprocessor executes the same instruction, but operates on different data. Each multiprocessor has on-chip memory of the four following types: One set of local 32-bit registers per processor, a parallel data cache or shared memory that is shared by all the processors and implements the shared memory space, a read-only constant cache that is shared by all the processors and speeds up reads from the constant memory space, which is implemented as a read-only region of device memory, and a read-only texture cache that is shared by all the processors and speeds up reads from the texture memory space, which is implemented as a read-only region of device memory. The local and global memory spaces are implemented as read-write regions of device memory and are not cached. Each multiprocessor accesses the texture cache via a texture unit. A grid of thread blocks is executed on the device by executing one or more blocks on each multiprocessor using time slicing: Each block is split into SIMD groups of threads called warps; each of these warps contains the same number of threads, called the warp size, and is executed by the multiprocessor in a SIMD fashion; a thread scheduler periodically switches from one warp to another to maximize the use of the multiprocessor's computational resources. A half-warp is either the first or second half of a warp. The way a block is split into warps is always the same; each warp contains threads of consecutive, increasing thread IDs with the first warp containing thread 0. A block is processed by only one multiprocessor, so that the shared memory space resides in the on-chip shared memory leading to very fast memory accesses. The multiprocessor's registers are allocated among the threads of the block. If the number of registers used per thread multiplied by the number of threads in the block is greater than the total number of registers per multiprocessor, the block cannot be executed and the corresponding kernel will fail to launch. Several blocks can be processed by the same multiprocessor concurrently by allocating the multiprocessor's registers and shared memory among the blocks. The issue order of the warps within a block is undefined, but their execution can be synchronized, to coordinate global or shared memory accesses. The issue order of the blocks within a grid of thread blocks is undefined and there is no synchronization mechanism between blocks, so threads from two different blocks of the same grid cannot safely communicate with each other through global memory during the execution of the grid.

Telephony control and switching applications have for many years employed general purpose computer operating systems, and indeed the UNIX system was originally developed by Bell Laboratories/AT&T. There are a number of available telephone switch platforms, especially private branch exchange implementations, which use an industry standard PC Server platform, typically with specialized telephony support hardware. These include, for example, Asterisk (from Digium) PBX platform, PBXtra (Fonality), Callweaver, Sangoma, etc. See also, e.g., www.voip-info.org/wiki/. Typically, these support voice over Internet protocol (VOIP) communications, in addition to switched circuit technologies.

As discussed above, typical automated telephone signaling provides in-band signaling which therefore employs acoustic signals. A switching system must respond to these signals, or it is deemed deficient. Typically, an analog or digital call progress tone detector is provided for each channel of a switched circuit system. For VOIP systems, this functionality maybe provided in a gateway (media gateway), either as in traditional switched circuit systems, or as a software process within a digital signal processor.

Because of the computational complexity of the call progress tone analysis task, the density of digital signal processing systems for simultaneously handling a large number of voice communications has been limited. For example, 8 channel call progress tone detection may be supported in a single Texas Instruments TMS320C5510™ digital signal processor (DSP). See, IP PBX Chip from Adaptive Digital Technologies, Inc. (www.adaptivedigital.com/product/solution/ip_pbx.htm). The tone detection algorithms consume, for example, over 1 MIPS per channel for a full suite of detection functions, depending on algorithm, processor architecture, etc. Scaling to hundreds of channels per system is cumbersome, and typically requires special purpose dedicated, and often costly, hardware which occupy a very limited number of expansion bus slots of a PBX system.

SUMMARY OF THE INVENTION

The present system and method improve the cost and efficiency of real time digital signal processing with respect to analog signals, and in particular, telephony signaling functions.

In one aspect of the invention, a massively parallel digital signal processor is employed to perform telephony in-band signaling detection and analysis. In another aspect, a massively parallel coprocessor card is added to a telephony server which is executed on a standard processor to increase call progress tone detection performance. Advantageously, the massively parallel processor is adapted to execute standard software, such as C language, and therefore may perform both massively parallel tasks, and with a likely lower degree of efficiency, serial execution tasks as well. Thus, a telephony system may be implemented on a single processor system, or within a distributed and/or processor/coprocessor architecture.

Data blocks, each including a time slice from a single audio channel, are fed in parallel to the massively parallel processor, which performs operations in parallel on a plurality of time slices, generally executing the same instruction on the plurality of time slices. In this system, real time performance may be effectively achieved, with a predetermined maximum processing latency. In many cases, it is not necessary to detect tones on each audio channel continuously, and therefore the system may sample each channel sequentially. In addition, if a Fast Fourier Transform-type algorithm is employed, the real (I) and imaginary (Q) channels may each be presented with data from different sources, leading to a doubling of capacity. Thus, for example, using an nVidia Tesla™ C870 GPU, with 128 processors, each processor can handle 8 (real only) or 16 (real and imaginary) audio channels, leading to a density of 1024 or 2048 channel call progress tone detection. Practically, the system is not operated at capacity, and therefore up to about 800 voice channels may be processed, using a general purpose commercially available coprocessor card for a PC architecture.

For example, a PC architecture server executes Asterisk PBX software under the Linux operating system. A call is provided from the Asterisk PBX software to a dynamic linked library (DLL), which transfers data from a buffer in main memory containing time slices for the analog channels to be processed. For example, 2 mS each for 800 channels, at an 8.4 kHz sampling rate is provided (132 kB) in the buffer. The buffer contents are transferred to the coprocessor through a PCIe x16 interface, along with a call to perform an FFT for each channel, with appropriate windowing, and/or using continuity from prior samples. The FFT may then be filtered on the coprocessor, with the results presented to the host processor, or the raw FFT data transferred to the host for filtering. Using a time-to-frequency domain transform, the signal energy at a specified frequency is converted to an amplitude peak at a specific frequency bin, which is readily extracted. Temporal analysis may also be performed in either the coprocessor or processor, though preferably this is performed in the processor. The analysis and data transform may also be used for speech recognition primitives, and for other processes.

A particular advantage of this architecture arises from the suitability of the call progress tone analysis to be performed in parallel, since the algorithm is deterministic and has few or no branch points. Thus, the task is defined to efficiently exploit the processing power and parallelism of a massively parallel processor.

DETAILED DESCRIPTION OF THE PREFERRED EMBODIMENTS

Figure 1:
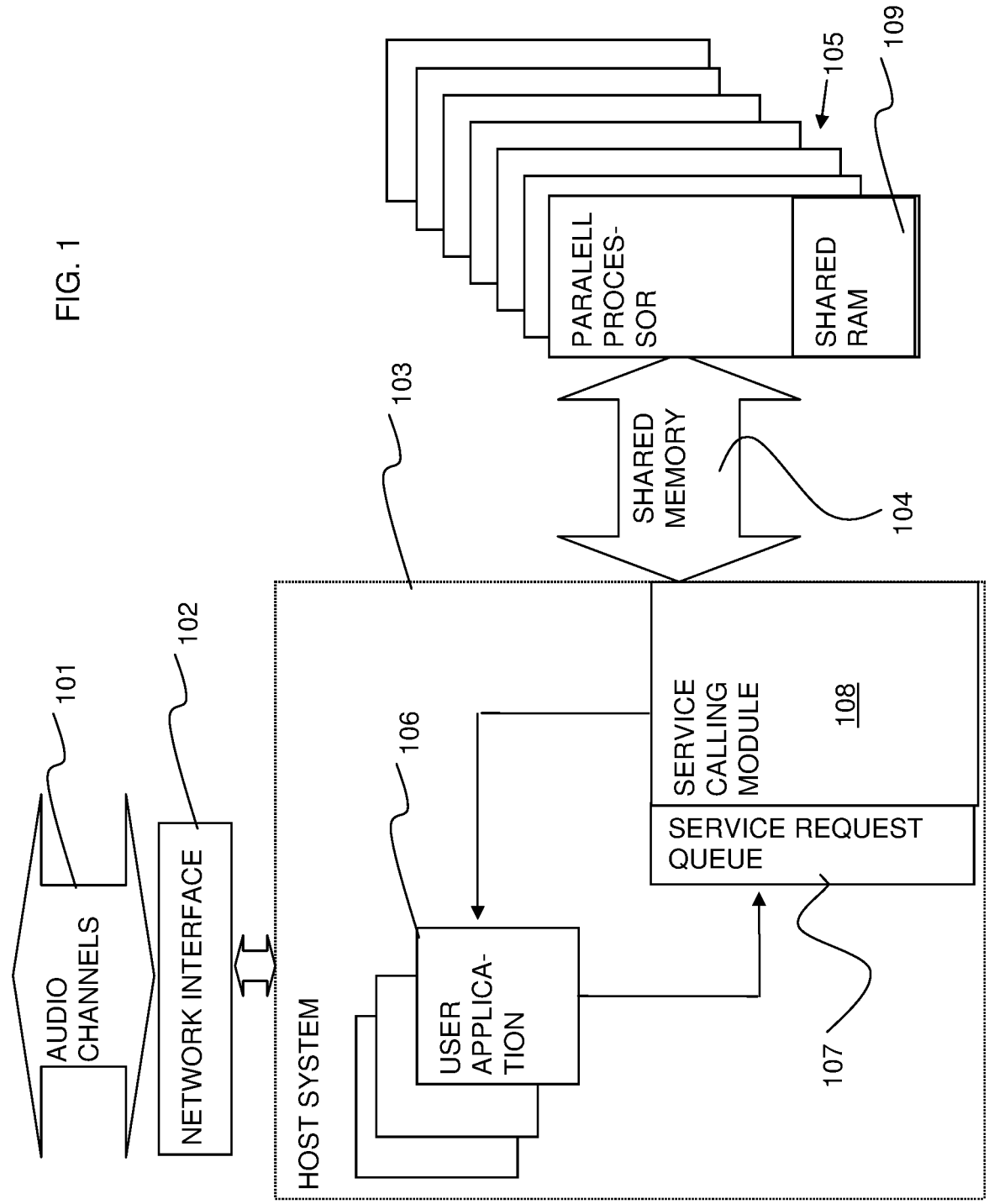
FIG. 1 is a schematic diagram of a system for implementing the invention.

One embodiment of the present invention provides a system and method for analyzing call progress tones and performing other types of audio band processing on a plurality of voice channels, for example in a telephone system. Examples of call progress tone analysis can be found at: www.commetrex.com/products/algorithms/CPA.html; www.dialogic.com/network/csp/appnots/10117_CPA_SR6_HMP2.pdf; whitepapers.zdnet.co.uk/0,1000000651,260123088p,00.htm; and www.pikatechnologies.com/downloads/samples/readme/6.2%20-%20Call %20Progress %20Analysis %20-%20ReadMe.txt, each of which is expressly incorporated herein by reference.

In a modest size system for analyzing call progress tones, there may be hundreds of voice channels to be handled are simultaneously. Indeed, the availability of a general-purpose call progress tone processing system permits systems to define non-standard or additional signaling capabilities, thus reducing the need for out of band signaling. Voice processing systems generally require real time performance; that is, connections must be maintained and packets or streams forwarded within narrow time windows, and call progress tones processed within tight specifications.

An emerging class of telephone communication processing system, implements a private branch exchange (PBX) switch, which employs a standard personal computer (PC) as a system processor, and employs software which executes on a general purpose operating system (OS).

For example, the Asterisk system runs on the Linux OS. More information about Asterisk may be found at Digium/Asterisk, 445 Jan Davis Drive NW, Huntsville, Ala. 35806, 256.428.6000 asterisk.org/downloads. Another such system is: "Yate" (Yet Another Telephony Engine), available from Bd. Nicolae Titulescu 10, Bl. 20, Sc. C, Ap. 128 Sector 1, Bucharest, Romania yate.null.ro/pmwiki/index.php?n=Main.Download.

In such systems, scalability to desired levels, for example hundreds of simultaneous voice channels, requires that the host processor have sufficient headroom to perform all required tasks within the time allotted. Alternately stated, the tasks performed by the host processor should be limited to those it is capable of completing without contention or undue delay. Because digitized audio signal processing is resource intensive, PC-based systems have typically not implemented functionality, which requires per-channel signal processing, or offloaded the processing to specialized digital signal processing (DSP) boards. Further, such DSP boards are themselves limited, for example 8-16 voice processed channels per DSP core, with 4-32 cores per board, although higher density boards are available. These boards are relatively expensive, as compared to the general-purpose PC, and occupy a limited number of bus expansion slots.

The present invention provides an alternate to the use of specialized DSP processors dedicated to voice channel processing. According to one embodiment, a massively parallel processor as available in a modern video graphics processor (though not necessarily configured as such) is employed to perform certain audio channel processing tasks, providing substantial capacity and versatility. One example of such a video graphics processor is the nVidia Tesla™ GPU, using the CUDA software development platform ("GPU"). This system provides 8 banks of 16 processors (128 processors total), each processor capable of handling a real-time fast Fourier transform (FFT) on 8-16 channels. For example, the FFT algorithm facilitates subsequent processing to detect call progress tones, which may be detected in the massively parallel processor environment, or using the host processor after downloading the FFT data. One particularly advantageous characteristic of implementation of a general purpose FFT algorithm rather than specific call tone detection algorithms is that a number of different call tone standards (and extensions/variants thereof) may be supported, and the FFT data may be used for a number of different purposes, for example speech recognition, etc.

Likewise, the signal processing is not limited to FFT algorithms, and therefore other algorithms may also or alternately be performed. For example, wavelet-based algorithms may provide useful information.

The architecture of the system provides a dynamic link library (DLL) available for calls from the telephony control software, e.g., Asterisk. An application programming interface (API) provides communication between the telephony control software (TCS) and the DLL. This TCS is either unmodified or minimally modified to support the enhanced functionality, which is separately compartmentalized.

The TCS, for example, executes a process which calls the DLL, causing the DLL to transfer a data from a buffer holding, e.g., 2 mS of voice data for, e.g., 800 voice channels, from main system memory of the PC to the massively parallel coprocessor (MPC), which is, for example an nVidia Tesla™ platform. The DLL has previously uploaded to the MPC the algorithm, which is, for example, a parallel FFT algorithm, which operates on all 800 channels simultaneously. It may, for example, also perform tone detection, and produce an output in the MPC memory of the FFT-representation of the 800 voice channels, and possibly certain processed information and flags. The DLL then transfers the information from the MPC memory to PC main memory for access by the TCS, or other processes, after completion.

While the MPC has massive computational power, it has somewhat limited controllability. For example, a bank of 16 DSPs in the MPC are controlled by a single instruction pointer, meaning that the algorithms executing within the MPC are generally not data-dependent in execution, nor have conditional-contingent branching, since this would require each thread to execute different instructions, and thus dramatically reduce throughput. Therefore, the algorithms are preferably designed to avoid such processes, and should generally be deterministic and non-data dependent algorithms. On the other hand, it is possible to perform contingent or data-dependent processing, though the gains from the massively parallel architecture are limited, and thus channel specific processing is possible. Advantageously, implementations of the FFT algorithm are employed which meet the requirements for massively parallel execution. For example, the CUDA™ technology environment from nVidia provides such algorithms Likewise, post processing of the FFT data to determine the presence of tones poses a limited burden on the processor(s), and need not be performed under massively parallel conditions. This tone extraction process may therefore be performed on the MPC or the host PC processor, depending on respective processing loads and headroom.

In general, the FFT itself should be performed in faster-than real-time manner. For example, it may be desired to implement overlapping FFTs, e.g., examining 2 mS of data every 1 mS, including memory-to-memory transfers and associated processing. Thus, for example, it may be desired to complete the FFT of 2 mS of data on the MPC within 0.5 mS. Assuming, for example, a sampling rate of 8.4 kHz, and an upper frequency within a channel of 3.2-4 kHz, the 2 mS sample, would generally imply a 256-point FFT, which can be performed efficiently and quickly on the nVidia Tesla™ platform, including any required windowing and post processing.

Therefore, the use of the present invention permits the addition of call progress tone processing and other per channel signal processing tasks to a PC based TCS platform without substantially increasing the processing burden on the host PC processor, and generally permits such a platform to add generic call progress tone processing features and other per channel signal processing features without substantially limiting scalability.

Other sorts of parallel real time processing are also possible, for example analysis of distributed sensor signals such as "Motes" or the like. See, en.wikipedia.org/wiki/

Smartdust. The MPC may also be employed to perform other telephony tasks, such as echo cancellation, conferencing, tone generation, compression/decompression, caller ID, interactive voice response, voicemail, packet processing and packet loss recovery algorithms, etc.

Similarly, simultaneous voice recognition can be performed on hundreds of simultaneous channels, for instance in the context of directing incoming calls based on customer responses at a customer service center. Advantageously, in such an environment, processing of particular channels maybe switched between banks of multiprocessors, depending on the processing task required for the channel and the instructions being executed by the multiprocessor. Thus, to the extent that the processing of a channel is data dependent, but the algorithm has a limited number of different paths based on the data, the MPC system may efficiently process the channels even where the processing sequence and instructions for each channel is not identical.

FIG. 1 shows a schematic of system for implementing the invention.

Massively multiplexed voice data 101 is received at network interface 102. The network could be a LAN, Wide Area Network (WAN), Prime Rate ISDN (PRI), a traditional telephone network with Time Division Multiplexing (TDM), or any other suitable network. This data may typically include hundreds of channels, each carrying a separate conversation and also routing information. The routing information may be in the form of in-band signaling of dual frequency (DTMF) audio tones received from a telephone keypad or DTMF generator. The channels may be encoded using digital sampling of the audio input prior to multiplexing. Typically voice channels will come in 20 ms frames.

The system according to a preferred coprocessor embodiment includes at least one host processor 103, which may be programmed with telephony software such as Asterisk or Yate, cited above. The host processor may be of any suitable type, such as those found in PCs, for example Intel Pentium Core 2 Duo or Quadra, or AMD Athlon X2. The host processor communicates via shared memory 104 with MPC 105, which is, for example 2 GB or more of DDR2 or DDR3 memory.

Within the host processor, application programs 106 receive demultiplexed voice data from interface 102, and generate service requests for services that cannot or are desired not to be processed in real time within the host processor itself. These service requests are stored in a service request queue 107. A service calling module 108 organizes the service requests from the queue 107 for presentation to the MPC 105.

The module 108 also reports results back to the user applications 106, which in turn put processed voice data frames back on the channels in real time, such that the next set of frames coming in on the channels 101 can be processed as they arrive.

Figure 2:
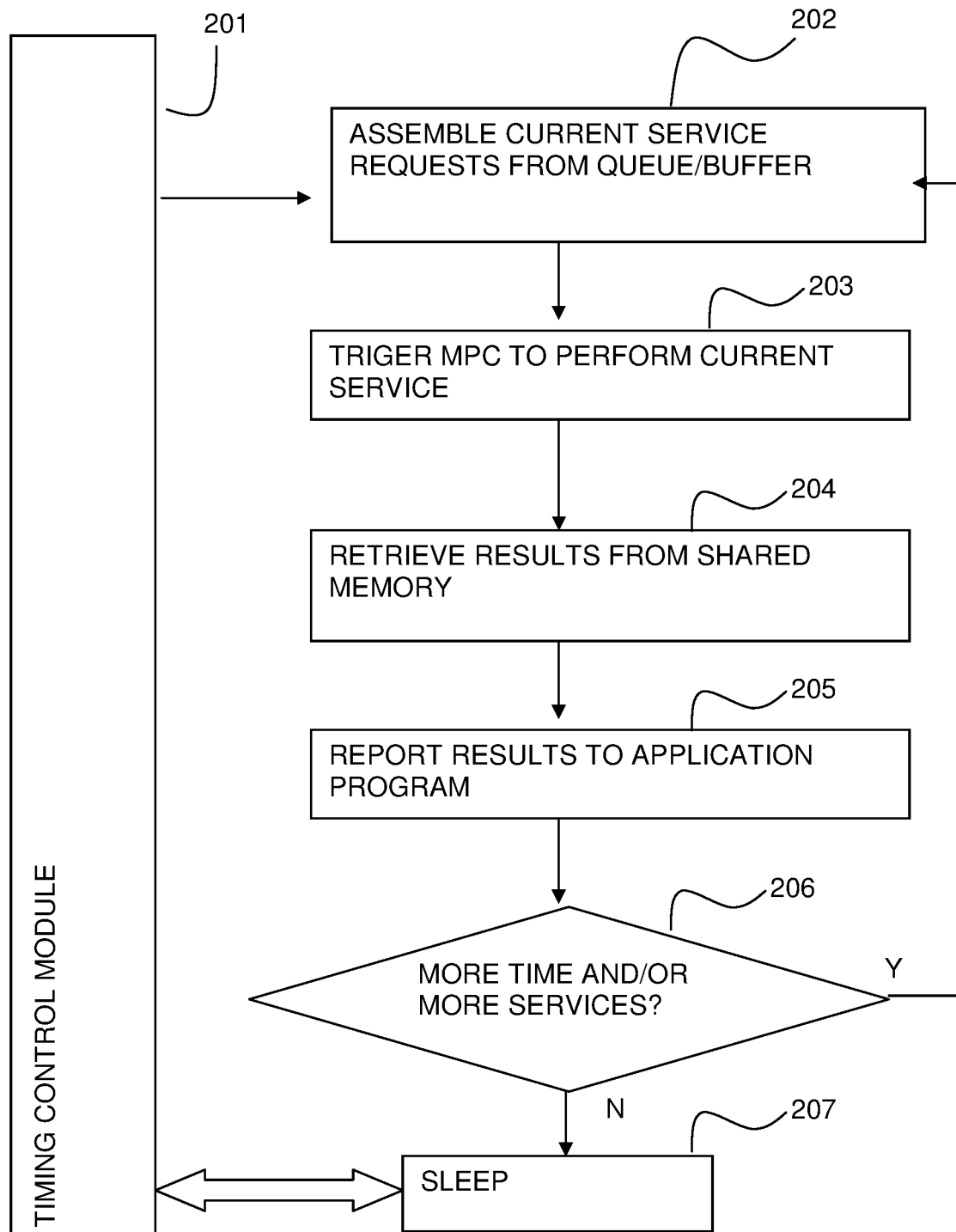
FIG. 2 is a flowchart of operations within a host processor
Figure 3:
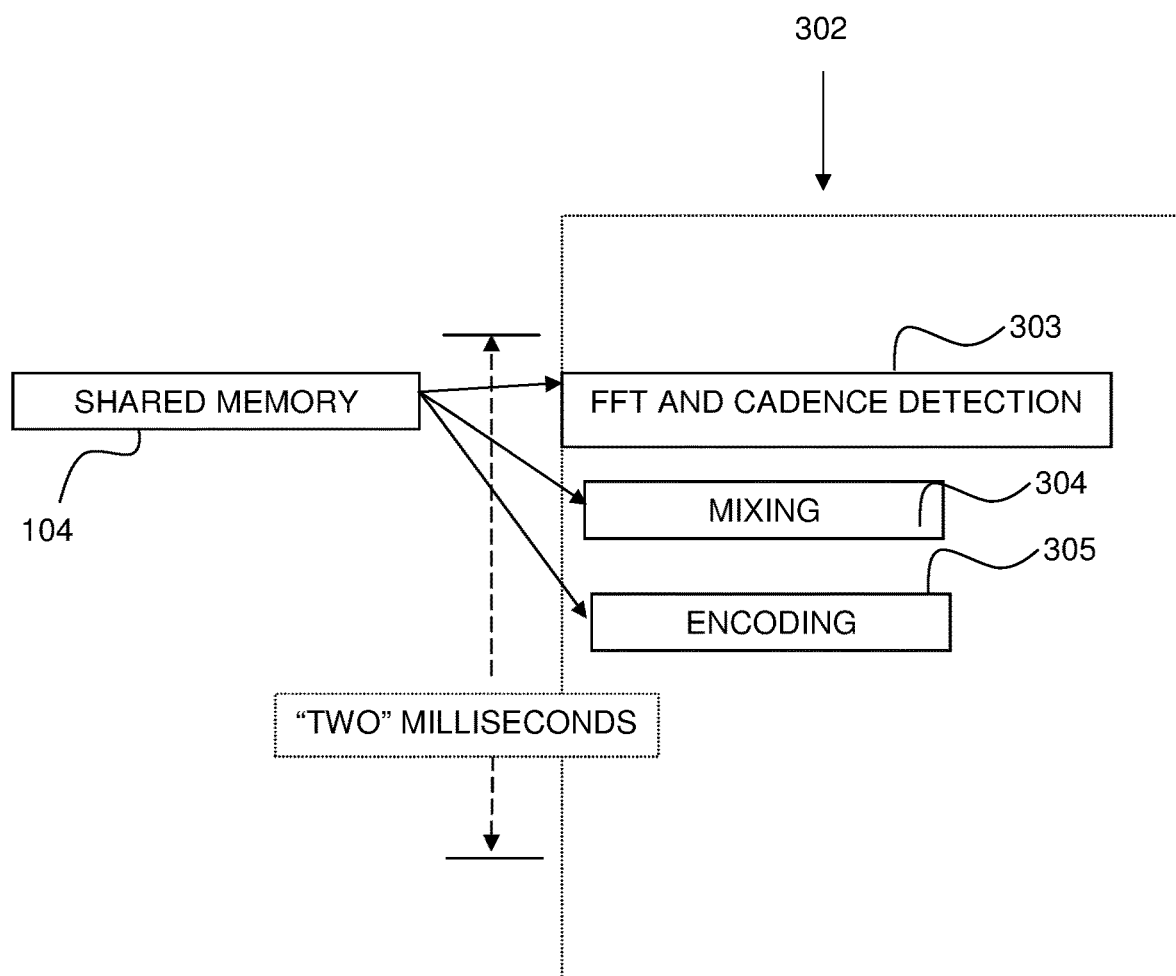
FIG. 3 is a schematic diagram showing operations with respect to a massively parallel co-processor.

FIG. 2 shows a process within module 108. In this process, a timing module 201 keeps track of a predetermined real time delay constraint. Since standard voice frames are 20 ms long, this constraint should be significantly less than that to allow operations to be completed in real time. A 5-10 ms delay would very likely be sufficient; however, a 2 ms delay would give a degree of comfort that real time operation will be assured. Then, at 202, e blocks of data requesting service are organized into the queue or buffer. At 203, the service calling module examines the queue to see what services are currently required. Some MPC's, such as the nVidia Tesla™ C870 GPU, require that each processor within a multiprocessor of the MPC perform the same operations in lockstep. For such MPC's, it will be necessary to choose all requests for the same service at the same time. For instance, all requests for an FFT should be grouped together and requested at once. Then all requests for a Mix operation might be grouped together and requested after the FFT's are completed—and so forth. The MPC 105 will perform the services requested and provide the results returned to shared memory 104. At 204, the service calling module will retrieve the results from shared memory and at 205 will report the results back to the application program. At 206, it is tested whether there is more time and whether more services are requested. If so, control returns to element 202. If not, at 207, the MPC is triggered to sleep (or be available to other processes) until another time interval determined by the real time delay constraint is begun, FIG. 3 shows an example of running several processes on data retrieved from the audio channels. The figure shows the shared memory 104 and one of the processors 302 from the MPC 105. The processor 302 first retrieves one or more blocks from the job queue or buffer 104 that are requesting an FFT and performs the FFT on those blocks. The other processors within the same multiprocessor array of parallel processors are instructed to do the same thing at the same time (on different data). After completion of the FFT, more operations can be performed. For instance, at 304 and 305, the processor 302 checks shared memory 104 to see whether more services are needed. In the examples given, mixing 304 and decoding 305 are requested by module 109, sequentially. Therefore, these operations are also performed on data blocks retrieved from the shared memory 104. The result or results of each operation are placed in shared memory upon completion of the operation, where those results are retrievable by the host processor.

In the case of call progress tones, these three operations together: FFT, mixing, and decoding, will determine the destination of a call associated with the block of audio data for the purposes of telephone switching.

If module 108 sends more request for a particular service than can be accommodated at once, some of the requests will be accumulated in a shared RAM 109 to be completed in a later processing cycle. The MPC will be able to perform multiple instances of the requested service within the time constraints imposed by the loop of FIG. 2. Various tasks may be assigned priorities, or deadlines, and therefore the processing of different services may be selected for processing based on these criteria, and need not be processed in strict order.

It is noted that the present invention is not limited to nVidia Tesla® parallel processing technology, and may make use of various other technologies. For example, the Intel Larrabee GPU technology, which parallelizes a number of P54C processors, may also be employed, as well as ATI CTM technology (ati.amd.com/technology/streamcomputing/index.html, ati.amd.com/technology/streamcomputing/resources.html, each of which, including linked resources, is expressly incorporated herein by reference), and other known technologies.

The following is some pseudo code illustrating embodiments of the invention as implemented in software. The disclosure of a software embodiment does not preclude the possibility that the invention might be implemented in hardware.

Embodiment 1

The present example provides computer executable code, which is stored in a computer readable medium, for execution on a programmable processor, to implement an embodiment of the invention. The computer is, for example, an Intel dual core processor-based machine, with one or more nVidia Tesla® compatible cards in PCIe x16 slots, for example, nVidia C870 or C1060 processor. The system typically stores executable code on a SATA-300 interface rotating magnetic storage media, i.e., a so-called hard disk drive, though other memory media, such as optical media, solid state storage, or other known computer readable media may be employed. Indeed, the instructions may be provided to the processors as electromagnetic signals communicated through a vacuum or conductive or dielectric medium. The nVidia processor typically relies on DDR3 memory, while the main processor typically relies on DDR2 memory, though the type of random-access memory is non-critical. The telephony signals for processing may be received over a T1, T3, optical fiber, Ethernet, or other communications medium and/or protocol.

Data Structures to be Used by Module 108
RQueueType Structure // Job Request Queue
   ServiceType
   ChannelID // Channel Identifier
   VoiceData // Input Data
   Output // Output Data
End Structure
// This embodiment uses a separate queue for each type of service to be requested.
// The queues have 200 elements in them. This number is arbitrary and could be adjusted
// by the designer depending on anticipated call volumes and numbers of processors available
// on the MPC. Generally, the number does not have to be as large as the total of number
// of simultaneous calls anticipated, because not all of those calls will be requesting services
// at the same time.
RQueueType RQueueFFT[200] // Maximum of 200 Requests FFT
RQueueType RQueueMIX[200] // Maximum of 200 Requests MIX
RQueueType RQueueENC[200] // Maximum of 200 Requests ENC
RQueueType RQueueDEC[200] // Maximum of 200 Requests DEC
Procedures to be Used by Module 108
// Initialization Function
   Init: Initialize Request Queue
   Initialize Service Entry
   Start Service Poll Loop
// Service Request Function
   ReqS: Case ServiceType
   FFT: Lock RQueueFFT
     Insert Service Information into RQueueFFT
     Unlock RQueueFFT
   MIX: Lock RQueueMIX
     Insert Service Information into RQueueMIX
     Unlock RQueueMIX
   ENC: Lock RQueueENC
     Insert Service Information into RQueueENC
     Unlock RQueueENC
   DEC: Lock RQueueDEC
     Insert Service Information into RQueueDEC
     Unlock RQueueDEC
   End Case
   Wait for completion of Service
   Return output
// Service Poll Loop
// This loop is not called by the other procedures. It runs independently. It will keep track of
// where the parallel processors are in their processing. The host will load all the requests for a
// particular service into the buffer. Then it will keep track of when the services are completed
// and load new requests into the buffer.
//SerPL:
Get timestamp and store in St
   // Let's do FFT/FHT
   Submit RQueueFFT with FFT code to GPU
   For all element in RQueueFFT
   Signal Channel of completion of service
   End For
   // Let's do mixing
   Submit RQueueMIX with MIXING code to GPU
   For all element in RQueueMIX
   Signal Channel of completion of service
   End For
   // Let's do encoding
   Submit RQueueENC with ENCODING code to GPU
   For all element in RQueueENC
   Signal Channel of completion of service
   End For
   // Let's do decoding
   Submit RQueueDEC with DECODING code to GPU
   For all element in RQueueDEC
   Signal Channel of completion of service
   End For
   // Make sure it takes the same amount of time for every pass
   Compute time difference between now and St
   Sleep that amount of time
   Goto SerPL // second pass
Examples of Code in Application Programs 106 for Calling the Routines Above
Example for Calling "Init"
   // we have to initialize PStar before we can use it
   Call Init
Example for Requesting an FFT
   // use FFT service for multitone detection
   Allocate RD as RQueueType
   RD.Service=FFT
   RD.ChannelID=Current Channel ID
   RD.Input=Voice Data
   Call ReqS(RD)
   Scan RD.Output for presence of our tones
Example for Requesting Encoding
   // use Encoding service
   Allocate RD as RQueueType
   RD.Service=ENCODE
   RD.ChannelID=Current Channel ID
   RD.Input=Voice Data
   Call ReqS(RD)
   // RD.Output contains encoded/compressed data
Example for Requesting Decoding
   // use Decoding service
   Allocate RD as RQueueType
   RD.Service=DECODE
   RD.ChannelID=Current Channel ID
   RD.Input=Voice Data
   Call ReqS(RD)
   // RD.Output contains decoded data

Embodiment 2

The second embodiment may employ similar hardware to Embodiment 1.

```
// this Embodiment is Slower, but Also Uses Less Memory than Embodiment #1 Above
Data Structures to be Used by Module 108
   RQueueType Structure // Job Request Queue
   ServiceType
   ChannelID // Channel Identifier
   VoiceData // Input Data
   Output // Output Data
   End Structure
   // This embodiment uses a single queue, but stores other data in a temporary queue
   // when the single queue is not available. This is less memory intensive, but slower.
   RQueueType RQueue[200] // Maximum of 200 Requests
Procedures to be Used by Module 108
   // Initialization Function
   Init: Initialize Request Queue
   Initialize Service Entry
   Start Service Poll Loop
   // Service Request Function
   ReqS: Lock RQueue
   Insert Service Information into RQueue
   Unlock RQueue
   Wait for completion of Service
   Return output
   // Service Poll Loop
   // to run continuously
   SerPL: Get timestamp and store in St
   // Let's do FFT/FHT
   For all element in RQueue where SerivceType=FFT
      Copy Data To TempRQueue
   End For
   Submit TempRQueue with FFT code to GPU
   For all element in TempRQueue
      Move TempRQueue.output to RQueue.output
      Signal Channel of completion of service
   End For
   // Let's do mixing
   For all element in RQueue where SerivceType=MIXING
      Copy Data To TempRQueue
   End For
   Submit TempRQueue with MIXING code to GPU
   For all element in RQueue
      Move TempRQueue.output to RQueue.output
      Signal Channel of completion of service
   End For
   // Let's do encoding
   For all element in RQueue where SerivceType=ENCODE
      Copy Data To TempRQueue
   End For
   Submit TempRQueue with ENCODING code to GPU
   For all element in RQueue
      Move TempRQueue.output to RQueue.output
      Signal Channel of completion of service
   End For
   // Let's do decoding
   For all element in RQueue where SerivceType=DECODE
      Copy Data To TempRQueue
   End For
   Submit TempRQueue with DECODING code to GPU
   For all element in RQueue
      Move TempRQueue.output to RQueue.output
      Signal Channel of completion of service
   End For
   // Make sure it takes the same amount of time for every pass
   Compute time difference between now and St
   Sleep that amount of time
   Goto SerPL // second pass
Examples of Code in the Application Programs 106 for Calling the Routines Above
Example for Calling "init"
   // we have to initialize PStar before we can use it
   Call Init
Example for Calling "FFT"
   // use FFT service for multitone detection
   Allocate RD as RQueueType
   RD.Service=FFT
   RD.ChannelID=Current Channel ID
   RD.Input=Voice Data
   Call ReqS(RD)
   Scan RD.Output for presents of our tones
Example for Calling Encoding
   // use Encoding service
   Allocate RD as RQueueType
   RD.Service=ENCODE
   RD.ChannelID=Current Channel ID
   RD.Input=Voice Data
   Call ReqS(RD)
   // RD.Output contains encoded/compressed data
Example for Calling Decoding
   // use Decoding service
   Allocate RD as RQueueType
   RD.Service=DECODE
   RD.ChannelID=Current Channel ID
   RD.Input=Voice Data
   Call ReqS(RD)
   // RD.Output contains decoded data
```

While the embodiment discussed above uses a separate host and massively parallel processing array, it is clear that the processing array may also execute general purpose code and support general purpose or application-specific operating systems, albeit with reduced efficiency as compared to an unbranched signal processing algorithm. Therefore, it is possible to employ a single processor core and memory pool, thus reducing system cost and simplifying system architecture. Indeed, one or more multiprocessors may be dedicated to signal processing, and other(s) to system control, coordination, and logical analysis and execution. In such a case, the functions identified above as being performed in the host processor would be performed in the array, and, of course, the transfers across the bus separating the two would not be required.

From a review of the present disclosure, other modifications will be apparent to persons skilled in the art. Such modifications may involve other features which are already known in the design, manufacture and use of telephony engines and parallel processing and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. The word "or" should be construed as an inclusive or, in other words as "and/or".

What is claimed is:

1. A method for processing signals, comprising:
   (a) receiving data representing a time slice of a stream of time-sequential information for each of a plurality of streams of time-sequential information;
   (b) automatically performing at least one transform process on the received time slice of the stream of time-sequential information for each of the plurality of streams of time-sequential information, to produce transformed data, with at least one single-instruction, multiple-data type parallel processor having a plurality of processing cores concurrently executing the same at least one transform process for each respective stream of time-sequential information, under a common set of instructions;
   (c) making at least one decision based on the transformed data of each time slice, with at least one single-instruction, multiple-data type parallel processor having a plurality of processing cores concurrently executing the same at least one transform process for each respective stream of time-sequential information, under a common set of instructions; and
   (d) communicating information representing the decision through a digital communication interface.

2. The method according to claim 1, wherein each stream of time-sequential information comprises audio information, and the decision is dependent on audio information within the respective stream of time-sequential information.

3. The method according to claim 1, wherein the at least one transform comprises a speech recognition primitive.

4. The method according to claim 1, wherein the decision is made based on information in a single stream of time-sequential information, independent of information contained in the other streams of time-sequential information.

5. The method according to claim 1, wherein the decision is made by a respective processing core of the at least one single-instruction, multiple-data type parallel processor having a plurality of processing cores for each respective time slice dependent solely on information in that respective time slice.

6. The method according to claim 1, wherein the at least one transform process is selected from the group consisting of a time-to-frequency domain transform algorithm, a wavelet domain transform algorithm, and a Goertzel filter algorithm.

7. The method according to claim 1, wherein the decision is made by the at least one single-instruction, multiple-data type parallel processor and represents a determination whether an in-band signal is present in a respective time slice.

8. The method according to claim 1, wherein the plurality of streams of time-sequential information comprise a plurality of different streams of time-sequential information, each different stream of time-sequential information comprising a stream of audio information which is processed in parallel by the at least one single-instruction, multiple-data type parallel processor, and the decision is made based on the at least one transform process in parallel by the at least one single-instruction, multiple-data type parallel processor having the plurality of processing cores executing concurrently under the common set of instructions.

9. The method according to claim 8, the common set of instructions controls the at least one single-instruction, multiple-data type parallel processor to perform at least a portion of a speech recognition process.

10. The method according to claim 1, wherein the common set of instructions comprises program instructions to perform a telephony task.

11. The method according to claim 1, wherein the at least one transform process comprises a Fourier transform.

12. The method according to claim 1, wherein the at least one single-instruction, multiple-data type parallel processor comprises a multiprocessor having a common instruction decode unit for the plurality of processing cores, each processing core having a respective arithmetic logic unit, all arithmetic logic units within a respective multiprocessor being adapted to concurrently execute the instructions of the instruction sequence on the time slices of the plurality of streams of time-sequential information representing a plurality of digitized real-time analog channels.

13. A non-transitory computer readable medium storing instructions for controlling a programmable processor to perform a method, comprising:
   (a) instructions for receiving data representing a plurality of respective time slices of a plurality of parallel streams of time-sequential information;
   (b) a common set of transform instructions for concurrently performing at least one transform process on the received plurality of respective time slices of the plurality of parallel streams of time-sequential information in parallel to produce respective transformed data for each respective time slice, with at least one single-instruction, multiple-data type parallel processor having a plurality of processing cores executing concurrently under the common set of transform instructions;
   (c) a common set of decisional instructions for concurrently making at least one decision based on the transformed data, with the at least one single-instruction, multiple-data type parallel processor having the plurality of processing cores executing concurrently under the common set of decisional instructions; and
   (d) instructions for communicating information representing the decision through a digital communication interface.

14. The non-transitory computer readable medium according to claim 13, wherein the instructions for making the at least one decision based on the at least one transform process comprise a common set of decision instructions for the at least one single-instruction, multiple-data type parallel processor for concurrently making the at least one decision on the respective time slices of the plurality of parallel streams of time-sequential information in parallel under the common set of decision instructions.

15. A system for processing streams of information, comprising:
   (a) an input port configured to receive data representing a plurality of time slices of a plurality of streams of time-sequential information;
   (b) at least one single-instruction, multiple-data type parallel processor having a plurality of processing cores synchronized to concurrently execute the same instruction, configured to:
      perform a transform process on the plurality of time slices to produce transformed data, the transform process being performed by concurrent execution of a common set of transform instructions on the plurality of processing cores; and make at least one decision based on the transformed data of the plurality of time slices, the decision being made by concurrent execution of a common set of decision instructions on the plurality of processing cores; and (c) an output port configured to communicate information representing the decision through a digital communication interface.

16. The system according to claim 15, wherein:
the plurality of streams of time sequential information comprise signals digitized at a sampling rate, and the decision is dependent on values of the signals digitized at the sampling rate.

17. The system according to claim 16, wherein the plurality of streams of time-sequential information comprise a plurality of audio streams, and the at least one decision comprises a determination of whether an in-band audio signal is present in a respective time slice of a respective stream of time-sequential information.

18. The system according to claim 15, wherein the common set of instructions are adapted to perform a plurality of concurrent tasks selected from the group consisting of an echo processing task, an audio compression task, an audio decompression task, a packet loss recovery task, a wavelet transform processing task, a combined time domain and frequency domain transform processing task, a speech recognition primitive task, and a stream combining task.

19. The system according to claim 15, wherein the at least one single-instruction, multiple-data type parallel processor comprises a multiprocessor having a common instruction decode unit for the plurality of processing cores, each processing core having a respective arithmetic logic unit, all arithmetic logic units within a respective multiprocessor being adapted to concurrently execute the respective instructions of the common set of instructions.

20. The system according to claim 15, wherein the single-instruction, multiple-data type parallel processor comprises a Peripheral Component Interconnect Express (PCIe) interface graphic processing unit of a computer system, which operates under control of a central processing unit and receives the plurality of time slices of a plurality of streams of time-sequential information by communication through the Peripheral Component Interconnect Express (PCIe) interface.

* * * * *